United States Patent
Nogiwa et al.

(10) Patent No.: US 12,512,640 B2
(45) Date of Patent: Dec. 30, 2025

(54) LASER SYSTEM, PULSE LASER LIGHT GENERATING METHOD, AND ELECTRONIC DEVICE MANUFACTURING METHOD

(71) Applicant: Gigaphoton Inc., Tochigi (JP)

(72) Inventors: SeijI Nogiwa, Oyama (JP); Takayuki Osanai, Oyama (JP)

(73) Assignee: Gigaphoton Inc., Tochigi (JP)

(*) Notice: Subject to any disclaimer, the term of this patent is extended or adjusted under 35 U.S.C. 154(b) by 100 days.

(21) Appl. No.: 18/658,286

(22) Filed: May 8, 2024

(65) Prior Publication Data
US 2024/0291220 A1    Aug. 29, 2024

Related U.S. Application Data

(63) Continuation of application No. PCT/JP2021/046744, filed on Dec. 17, 2021.

(51) Int. Cl.
*H01S 3/00*    (2006.01)
*G02F 1/35*    (2006.01)
(Continued)

(52) U.S. Cl.
CPC .......... *H01S 3/0092* (2013.01); *G02F 1/3507* (2021.01); *G02F 1/3534* (2013.01);
(Continued)

(58) Field of Classification Search
CPC .... H01S 3/0092; H01S 5/0085; H01S 3/0085; H01S 3/2375; H01S 3/10; G02F 1/3507;
(Continued)

(56) References Cited

U.S. PATENT DOCUMENTS

2005/0206997 A1*   9/2005   Hubbard .................. G02F 1/39
                                                 359/330
2005/0238070 A1*   10/2005   Imeshev .................. G02F 1/39
                                                 359/326
(Continued)

FOREIGN PATENT DOCUMENTS

JP          2002099011 A   *   4/2002
JP          2012199425 A   *   10/2012        H01S 3/0085
(Continued)

OTHER PUBLICATIONS

Machine translation of JP-2002099011-A (Year: 2002).*
(Continued)

*Primary Examiner* — Steven H Whitesell
(74) *Attorney, Agent, or Firm* — Studebaker Brackett PLLC

(57) ABSTRACT

A laser system includes a first laser outputting first laser light, an optical intensity changer outputting first pulse laser light, a modulator widening spectral linewidth of the first laser light or the first pulse laser light, an optical fiber amplifier amplifying the first pulse laser light and outputting second pulse laser light, a second laser outputting second laser light, an optical parametric amplifier amplifying the second laser light and outputting third pulse laser light, a wavelength converter outputting fourth pulse laser light using the second and third pulse laser light, an amplification section amplifying the fourth pulse laser light and outputting fifth pulse laser light, and a processor controlling a modulation signal such that the fifth pulse laser light having target spectral linewidth is generated, and controlling the center wavelength of the second laser light such that the fifth pulse laser light having a target center wavelength is generated.

17 Claims, 10 Drawing Sheets

(51) Int. Cl.
*G02F 1/355* (2006.01)
*G02F 1/39* (2006.01)
*G03F 7/00* (2006.01)
*G03F 7/20* (2006.01)
*H01S 5/00* (2006.01)
*G02B 27/14* (2006.01)

(52) U.S. Cl.
CPC ............ *G02F 1/3551* (2013.01); *G02F 1/392* (2021.01); *G03F 7/2002* (2013.01); *G03F 7/70025* (2013.01); *G03F 7/70041* (2013.01); *G03F 7/70575* (2013.01); *H01S 5/0085* (2013.01); *G02B 27/141* (2013.01); *G02F 2203/11* (2013.01)

(58) Field of Classification Search
CPC ...... G02F 1/3534; G02F 1/3551; G02F 1/392; G02F 1/35; G02F 1/354; G02F 1/37; G02F 1/39; G03F 7/2002; G03F 7/70025; G03F 7/70041; G03F 7/70575; G02B 27/141
See application file for complete search history.

(56) References Cited

U.S. PATENT DOCUMENTS

| | | | |
|---|---|---|---|
| 2009/0185583 A1* | 7/2009 | Kuksenkov | G03F 7/70025 372/5 |
| 2013/0279526 A1* | 10/2013 | Kakizaki | H01S 3/2375 372/98 |
| 2016/0344158 A1* | 11/2016 | Onose | H01S 3/10015 |
| 2017/0279241 A1* | 9/2017 | Onose | H01S 3/0912 |
| 2017/0338617 A1* | 11/2017 | Zhao | H01S 3/10015 |
| 2017/0338619 A1* | 11/2017 | Onose | H01S 3/10015 |
| 2019/0103725 A1* | 4/2019 | Fuchimukai | G02F 1/37 |
| 2020/0363697 A1* | 11/2020 | Qu | G03F 7/70041 |
| 2021/0194215 A1* | 6/2021 | Miura | H01S 5/06821 |
| 2021/0226411 A1* | 7/2021 | Miura | H01S 3/225 |
| 2021/0226414 A1* | 7/2021 | Miura | G03F 7/70575 |

FOREIGN PATENT DOCUMENTS

| | | |
|---|---|---|
| WO | 2020/084685 A1 | 4/2020 |
| WO | 2020/095418 A1 | 5/2020 |
| WO | 2020/110177 A1 | 6/2020 |

OTHER PUBLICATIONS

Machine translation of JP-2012199425-A (Year: 2012).*
International Search Report issued in PCT/JP2021/046744; mailed Jan. 25, 2022.
International Preliminary Report on Patentability and Written Opinion issued in PCT/JP2021/046744; issued Jun. 13, 2024.

* cited by examiner

LASER SYSTEM, PULSE LASER LIGHT GENERATING METHOD, AND ELECTRONIC DEVICE MANUFACTURING METHOD

CROSS-REFERENCE TO RELATED APPLICATIONS

The present application is a continuation application of International Application No. PCT/JP2021/046744, filed on Dec. 17, 2021, the entire contents of which are hereby incorporated by reference.

BACKGROUND

1. Technical Field

The present disclosure relates to a laser system, a pulse laser light generating method, and an electronic device manufacturing method.

2. Related Art

In recent years, a semiconductor exposure apparatus is required to improve the resolution thereof as semiconductor integrated circuits are increasingly miniaturized and highly integrated. To this end, reduction in the wavelength of light output from a light source for exposure is underway. For example, a KrF excimer laser apparatus, which outputs laser light having a wavelength of about 248 nm, and an ArF excimer laser apparatus, which outputs laser light having a wavelength of about 193 nm, are used as a gas laser apparatus for exposure.

The light from spontaneously oscillating KrF and ArF excimer laser apparatuses has a wide spectral linewidth ranging from 350 to 400 pm. A projection lens made of a material that transmits ultraviolet light, such as KrF and ArF laser light, therefore produces chromatic aberrations in some cases. As a result, the resolution of the projection lens may decrease. To avoid the decrease in the resolution, the spectral linewidth of the laser light output from the gas laser apparatus needs to be narrow enough to make the chromatic aberrations negligible. To this end, a line narrowing module (LNM) including a line narrowing element (such as etalon or grating) is provided in some cases in a laser resonator of the gas laser apparatus to narrow the spectral linewidth. A gas laser apparatus providing a narrowed spectral linewidth is hereinafter referred to as a narrowed-line gas laser apparatus.

CITATION LIST

Patent Literature

[PTL 1] U.S. Patent application Publication No. 2021/0226414
[PTL 2] U.S. Patent application Publication No. 2017/0338619

SUMMARY

A laser system according to an aspect of the present disclosure includes a first laser configured to output first continuous-wave laser light, an optical intensity changer configured to pulse the first laser light and output first pulse laser light, a modulator configured to widen a spectral linewidth of the first laser light or the first pulse laser light in accordance with a modulation signal, an optical fiber amplifier configured to amplify the first pulse laser light and output second pulse laser light, a center-wavelength-variable second laser configured to output second continuous-wave laser light, an optical parametric amplifier configured to pulse and amplify the second laser light and output third pulse laser light, and a wavelength converter configured to output fourth pulse laser light by using the second pulse laser light and the third pulse laser light, the wavelength converter including a first nonlinear crystal, a second nonlinear crystal, a third nonlinear crystal, and a fourth nonlinear crystal, in response to receiving the second pulse laser light, the first nonlinear crystal outputting first harmonic light, in response to receiving the first harmonic light, the second nonlinear crystal outputting second harmonic light, in response to receiving the second harmonic light and the third pulse laser light, the third nonlinear crystal outputting first sum-frequency light and the third pulse laser light, in response to receiving the first sum-frequency light and the third pulse laser light, the fourth nonlinear crystal outputting fourth pulse laser light that is second sum-frequency light, an amplification section configured to amplify the fourth pulse laser light and output fifth pulse laser light, and a processor configured to accept instructions of a target spectral linewidth and a target center wavelength, control the modulation signal in such a way that the fifth pulse laser light having the instructed target spectral linewidth is generated, and control a center wavelength of the second laser light in such a way that the fifth pulse laser light having the instructed center wavelength is generated.

A pulse laser light generating method according to another aspect of the present disclosure includes causing a first laser to output first continuous-wave laser light, causing an optical intensity changer to pulse the first laser light and output first pulse laser light, causing a modulator to widen a spectral linewidth of the first laser light or the first pulse laser light in accordance with a modulation signal, causing an optical fiber amplifier to amplify the first pulse laser light and output second pulse laser light, causing a center-wavelength-variable second laser to output second continuous-wave laser light, causing an optical parametric amplifier to pulse and amplify the second laser light and output third pulse laser light, inputting the second pulse laser light to a first nonlinear crystal provided in a wavelength converter further including, a second nonlinear crystal, a third nonlinear crystal, and a fourth nonlinear crystal to cause the first nonlinear crystal to output first harmonic light, inputting the first harmonic light to the second nonlinear crystal to cause the second nonlinear crystal to output second harmonic light, inputting the second harmonic light and the third pulse laser light to the third nonlinear crystal to cause the third nonlinear crystal to output first sum-frequency light and the third pulse laser light, inputting the first sum-frequency light and the third pulse laser light to the fourth nonlinear crystal to cause the fourth nonlinear crystal to output fourth pulse laser light that is second sum-frequency light, causing an amplification section to amplify the fourth pulse laser light and output fifth pulse laser light, causing a processor to control the modulation signal in such a way that the fifth pulse laser light having a target spectral linewidth instructed from an external apparatus is generated, and causing the processor to control a center wavelength of the second laser light in such a way that the fifth pulse laser light having a target center wavelength instructed from the external apparatus is generated.

An electronic device manufacturing method according to another aspect of the present disclosure includes generating fifth pulse laser light by a laser system, outputting the fifth pulse laser light to an exposure apparatus, and exposing a photosensitive substrate to the fifth pulse laser light in the exposure apparatus to manufacture electronic devices, the laser system including a first laser configured to output first continuous-wave laser light, an optical intensity changer configured to pulse the first laser light and output first pulse laser light, a modulator configured to widen a spectral linewidth of the first laser light or the first pulse laser light in accordance with a modulation signal, an optical fiber amplifier configured to amplify the first pulse laser light and output second pulse laser light, a center-wavelength-variable second laser configured to output second continuous-wave laser light, an optical parametric amplifier configured to pulse and amplify the second laser light and output third pulse laser light, and a wavelength converter configured to output fourth pulse laser light by using the second pulse laser light and the third pulse laser light, the wavelength converter including a first nonlinear crystal, a second nonlinear crystal, a third nonlinear crystal, and a fourth nonlinear crystal, in response to receiving the second pulse laser light, the first nonlinear crystal outputting first harmonic light, in response to receiving the first harmonic light, the second nonlinear crystal outputting second harmonic light, in response to receiving the second harmonic light and the third pulse laser light, the third nonlinear crystal outputting first sum-frequency light and the third pulse laser light, in response to receiving the first sum-frequency light and the third pulse laser light, the fourth nonlinear crystal outputting fourth pulse laser light that is second sum-frequency light, an amplification section configured to amplify the fourth pulse laser light and output the fifth pulse laser light, and a processor configured to accept instructions of a target spectral linewidth and a target center wavelength, control the modulation signal in such a way that the fifth pulse laser light having the instructed target spectral linewidth is generated, and control a center wavelength of the second laser light in such a way that the fifth pulse laser light having the instructed target center wavelength is generated.

BRIEF DESCRIPTION OF DRAWINGS

Embodiments of the present disclosure will be described below only by way of example with reference to the accompanying drawings.

DETAILED DESCRIPTION

Figure 1:
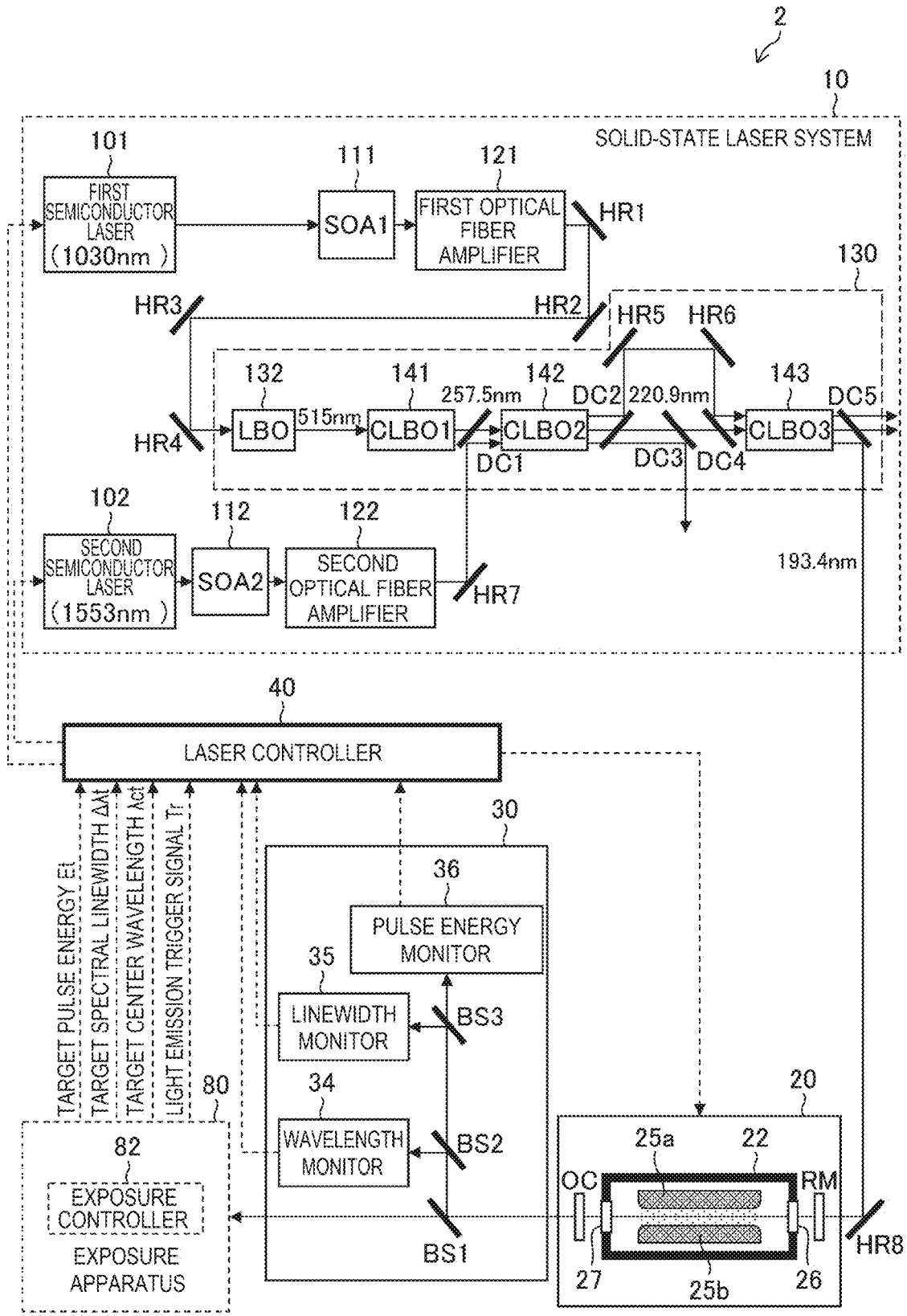
FIG. 1 schematically shows the configuration of a laser processing system according to Comparative Example.

Contents
   1. Overview of Laser System According to Comparative Example
   1.1 Configuration
   1.2 Operation
   1.3 Problems
   2. First Embodiment
   2.1 Configuration
   2.2 Operation
   2.3 Example of spectral linewidth control
   2.4 Example of center wavelength control
   2.5 Effects
   2.6 Variations
   2.6.1 Configuration
   2.6.2 Operation
   2.6.3 Example of spectral linewidth control
   2.6.4 Effects
   3. Second Embodiment
   3.1 Configuration
   3.2 Operation
   3.3 Example of spectral linewidth control
   3.4 Effects
   4. Electronic device manufacturing method
   5. Others Embodiments of the present disclosure will be described below in detail with reference to the drawings. The embodiments described below show some examples of the present disclosure and are not intended to limit the contents of the present disclosure. Furthermore, all configurations and operations described in the embodiments are not necessarily essential as configurations and operations in the present disclosure. The same component has the same reference character, and no redundant description of the same component will be made.

1. Overview of Laser System According to Comparative Example 1.1 Configuration

FIG. 1 schematically shows the configuration of a laser system 2 according to Comparative Example. Comparative Example in the present disclosure is an aspect that the applicant is aware of as known only by the applicant, and is not a publicly known example that the applicant is self-aware of.

The laser system 2 shown in FIG. 1 is a solid-state laser system using a semiconductor laser and generates pulse laser light having a wavelength of 194.3 nm, and an excimer amplifier amplifies the pulse laser light. Note that the numerical values of the wavelengths described herein are representative values, but are not necessarily employed, and may be values in the vicinity of the numerical values of the wavelengths. For example, the wavelength of 194.3 nm described above includes a wavelength of approximately 194.3 nm unless otherwise stated.

The laser system 2 includes a solid-state laser system 10, an excimer amplifier 20, a monitor module 30, and a laser controller 40. The solid-state laser system 10 includes a first semiconductor laser 101, a second semiconductor laser 102, a first semiconductor optical amplifier (SOA) 111, a second semiconductor optical amplifier 112, a first optical fiber amplifier 121, a second optical fiber amplifier 122, and a wavelength converter 130. In the drawings, note, for example, that the first semiconductor laser 101 is denoted as a "semiconductor laser 1", and that the first semiconductor optical amplifier 111 is denoted as an "SOA1".

The first semiconductor laser 101 is, for example, a semiconductor laser that continuously oscillates at a wavelength of 1030 nm and oscillates in the single longitudinal mode.

The second semiconductor laser 102 is, for example, a semiconductor laser that continuously oscillates at a wavelength of 1553 nm and oscillates in the single longitudinal mode. The first semiconductor laser 101 and the second semiconductor laser 102 may each be a distributed feedback-laser diode (DFB-LD), a distributed Bragg reflector laser diode (DBR-LD), or an external-cavity DBR laser.

The first semiconductor optical amplifier 111 pulses and amplifies the continuous-wave laser light output from the first semiconductor laser 101. The second semiconductor optical amplifier 112 pulses and amplifies the continuous-wave laser light output from the second semiconductor laser 102.

The first optical fiber amplifier 121 amplifies the energy of the pulse laser light output from the first semiconductor optical amplifier 111. The second optical fiber amplifier 122 amplifies the energy of the pulse laser light output from the second semiconductor optical amplifier 112. The first optical fiber amplifier 121 and the second optical fiber amplifier 122 may each, for example, be a Yb fiber amplifier or a Yb-YAG crystal.

The pulse laser light amplified by the first optical fiber amplifier 121 is reflected, for example, off a first highly reflective mirror HR1, a second highly reflective mirror HR2, a third highly reflective mirror HR3, and a fourth highly reflective mirror HR4, and introduced into the wavelength converter 130.

The wavelength converter 130 converts the near-infrared-wavelength laser light output from each of the first semiconductor laser 101 and the second semiconductor laser 102 into ultraviolet-wavelength laser light. In the description, the near-infrared wavelength ranges from 780 nm to 2500 nm, and the ultraviolet wavelength ranges from 150 nm to 380 nm. The wavelength converter 130 may include an LBO crystal 132, a first CLBO crystal 141, a first dichroic mirror DC1, a second CLBO crystal 142, a second dichroic mirror DC2, a third dichroic mirror DC3, a fourth dichroic mirror DC4, a fifth highly reflective mirror HR5, a sixth highly reflective mirror HR6, a third CLBO crystal 143, and a fifth dichroic mirror DC5. LBO is expressed by a chemical formula $LiB_3O_5$. CLBO is expressed by a chemical formula $CsLiB_6O_{10}$. The LBO and CLBO crystals are each a nonlinear crystal for wavelength conversion. The term "nonlinear crystal" is synonymous with a term "nonlinear optical crystal".

The LBO crystal 132 is so disposed that the pulse laser light having the wavelength of 1030 nm and output from the first optical fiber amplifier 121 is incident on the LBO crystal 132.

The first CLBO crystal 141 is so disposed that the pulse laser light having a wavelength of 515 nm from the LBO crystal 132 is incident on the first CLBO crystal 141.

The first dichroic mirror DC1 is disposed between the first CLBO crystal 141 and the second CLBO crystal 142, and is coated with a film that reflects the pulse laser light having the wavelength of 1553 nm from the second optical fiber amplifier 122 at high reflectance and transmits the pulse laser light having a wavelength of 257.5 nm from the first CLBO crystal 141 at high transmittance.

The second CLBO crystal 142 is so disposed that the pulse laser light having the wavelength of 257.5 nm and having passed through the first dichroic mirror DC1 and the pulse laser light having the wavelength of 1553 nm reflected off the first dichroic mirror DC1 are incident on the second CLBO crystal 142.

The second dichroic mirror DC2 is disposed between the second CLBO crystal 142 and the third dichroic mirror DC3 and is coated with a film that reflects the pulse laser light having the wavelength of 1553 nm from the second CLBO crystal 142 (third pulse laser light PL3) at high reflectance and transmits the pulse laser light having the wavelength of 257.5 nm and the pulse laser light having a wavelength of 220.9 nm both from the second CLBO crystal 142 at high transmittance.

The third dichroic mirror DC3 is disposed between the second dichroic mirror DC2 and the fourth dichroic mirror DC4 and is coated with a film that reflects the pulse laser light having the wavelength of 257.5 nm from the second dichroic mirror DC2 at high reflectance and transmits the pulse laser light having the wavelength of 220.9 nm at high transmittance.

The fourth dichroic mirror DC4 is disposed between the third dichroic mirror DC3 and the third CLBO crystal 143 and is coated with a film that reflects the pulse laser light having the wavelength of 1553 nm from the sixth highly reflective mirror HR6 at high reflectance and transmits the pulse laser light having the wavelength of 220.9 nm from the third dichroic mirror DC3 at high transmittance.

The third CLBO crystal 143 is so disposed that the pulse laser light having the wavelength of 220.9 nm and the pulse laser light having the wavelength of 1553 nm from the fourth dichroic mirror DC4 are incident on the third CLBO crystal 143.

The fifth dichroic mirror DC5 is disposed between the third CLBO crystal 143 and the excimer amplifier 20 and is coated with a film that reflects the pulse laser light having a wavelength of 193.4 nm from the third CLBO crystal 143 at high reflectance and transmits the pulse laser light having the wavelength of 220.9 nm and the pulse laser light having wavelength of 1553 nm from the third CLBO crystal 143 at high transmittance.

The excimer amplifier 20 includes a rear mirror RM, a chamber 22, and an output coupler OC. The rear mirror RM and the output coupler OC constitute an optical resonator, and the chamber 22 is disposed on the optical path of the optical resonator. The optical resonator is a Fabry-Perot optical resonator and includes the rear mirror RM, which partially reflects and transmits part of the laser light, and the output coupler OC, which partially reflects and transmits part of the laser light. The reflectance of the output coupler OC may range, for example, from 10% to 30%, and the reflectance of the rear mirror RM may range, for example, from 80% to 90%. The optical resonator may be a ring resonator, and the amplifier may, for example, be a multi-pass amplifier, such as a three-pass amplifier in which seed light is reflected off a cylindrical mirror and passes through a discharge space three times for amplification.

The chamber 22 includes a pair of discharge electrodes 25a and 25b, and two windows 26 and 27, through which the laser light passes. An excimer laser gas is introduced into the chamber 22. The excimer laser gas contains, for example, a rare gas, a halogen gas, and a buffer gas. The rare gas may be an Ar or Kr gas. The halogen gas may, for example, be an $F_2$ gas. The buffer gas may, for example, be an Ne gas.

The monitor module 30 is disposed to measure the center wavelength, the spectral linewidth, and the pulse energy of the pulse laser light output from the excimer amplifier 20. The monitor module 30 includes a first beam splitter BS1, a wavelength monitor 34, a second beam splitter BS2, a linewidth monitor 35, a third beam splitter BS3, and a pulse energy monitor 36.

The first beam splitter BS1 is disposed on the optical path of the pulse laser light output from the excimer amplifier 20. The second beam splitter BS2 and the third beam splitter BS3 are disposed on the optical path of the pulse laser light reflected off the first beam splitter BS1. The wavelength monitor 34 is so disposed that the pulse laser light reflected off the second beam splitter BS2 is incident on the wavelength monitor 34. The wavelength monitor 34 measures the wavelength of the pulse laser light. The wavelength monitor 34 is, for example, an etalon spectrometer.

The third beam splitter BS3 is disposed between the second beam splitter BS2 and the pulse energy monitor 36. The linewidth monitor 35 is so disposed that the pulse laser light reflected off the third beam splitter BS3 is incident on the linewidth monitor 35. The linewidth monitor 35 precisely measures the spectral linewidth of the pulse laser light. The linewidth monitor 35 is, for example, an etalon spectrometer. The pulse energy monitor 36 is so disposed that the pulse laser light having passed through the third beam splitter BS3 is incident on the pulse energy monitor 36. The pulse energy monitor 36 detects the pulse energy of the pulse laser light. The pulse energy monitor 36 may, for example, be a pulse energy sensor including a photodiode or a pyroelectric device.

1.2 Operation

The laser controller 40 keeps the first semiconductor laser 101 and the second semiconductor laser 102 continuously oscillating. The first semiconductor optical amplifier 111 pulses and amplifies the continuous-wave laser light having a wavelength of 1030 nm and output from the first semiconductor laser 101. The pulse laser light having undergone the pulsing operation has a pulse width ranging, for example, from 10 ns to 40 ns.

The pulse laser light output from the first semiconductor optical amplifier 111 enters the first optical fiber amplifier 121, which amplifies the pulse laser light. The pulse laser light amplified by the first optical fiber amplifier 121 enters the LBO crystal 132. The LBO crystal 132 is so adjusted that the angle of incidence of the pulse laser light having the wavelength of 1030 nm satisfies the phase matching condition for generation of the second harmonic of the pulse laser light having the wavelength of 1030 nm. As a result, the pulse laser light having the wavelength of 515 nm, which is the second harmonic of the pulse laser light having the wavelength of 1030 nm, is generated.

The pulse laser light having the wavelength of 515 nm enters the first CLBO crystal 141. The first CLBO crystal 141 is so adjusted that the angle of incidence of the pulse laser light having the wavelength of 515 nm satisfies the phase matching condition for generation of the second harmonic of the pulse laser light having the wavelength of 515 nm. As a result, the pulse laser light having the wavelength of 257.5 nm, which is the second harmonic of the pulse laser light having the wavelength of 515 nm, is generated.

The second semiconductor optical amplifier 112 pulses and amplifies the continuous-wave laser light having the wavelength of 1553 nm and output from the second semiconductor laser 102. The pulse laser light having undergone the pulsing operation has a pulse width ranging, for example, from 10 ns to 40 ns. The pulse laser light output from the second semiconductor optical amplifier 112 enters the second optical fiber amplifier 122, which amplifies the pulse laser light.

The first dichroic mirror DC1 combines the pulse laser light having the wavelength of 257.5 nm and the pulse laser light having the wavelength of 1553 nm with each other, and the combined pulse laser light enters the second CLBO crystal 142. The second CLBO crystal 142 is so adjusted that the angles of incidence of the pulse laser light having the wavelength of 257.5 nm and the pulse laser light having the wavelength of 1553 nm satisfy the phase matching condition for generation of sum-frequency light. As a result, pulse laser light having the wavelength of 220.9 nm, which is the sum-frequency light generated from the pulse laser light having the wavelength of 257.5 nm and the pulse laser light having the wavelength of 1553 nm, is generated. Note that the second CLBO crystal 142 outputs the pulse laser light having the wavelength of 220.9 nm as well as the pulse laser light having the wavelength of 257.5 nm and the pulse laser light having the wavelength of 1553 nm.

The pulse laser light having the wavelength of 257.5 nm passes through the second dichroic mirror DC2, is then reflected off the third dichroic mirror DC3, and deviates from the optical path. The pulse laser light having the wavelength of 1553 nm and output from the second CLBO crystal 142 is reflected off the second dichroic mirror DC2, and is then incident on the fourth dichroic mirror DC4 via the fifth highly reflective mirror HR5 and the sixth highly reflective mirror HR6. The fourth dichroic mirror DC4 combines the pulse laser light having the wavelength of 220.9 nm and the pulse laser light having the wavelength of 1553 nm with each other, and the combined pulse laser light enters the third CLBO crystal 143. The third CLBO crystal 143 is so adjusted that the angles of incidence of the pulse laser light having the wavelength of 220.9 nm and the pulse laser light having the wavelength of 1553 nm satisfy the phase matching condition for generation of sum-frequency light. As a result, pulse laser light having the wavelength of 193.4 nm, which is the sum-frequency light generated from the pulse laser light having the wavelength of 220.9 nm and the pulse laser light having the wavelength of 1553 nm, is generated.

The pulse laser light having the wavelength of 193.4 nm reflected off the fifth dichroic mirror DC5 at high reflectance enters the excimer amplifier 20 via an eighth highly reflective mirror HR8.

At the timing when the pulse laser light having passed through the rear mirror RM enters the chamber 22, a power supply that is not shown applies high voltage pulses to the space between the discharge electrodes 25a and 25b in the chamber 22. When discharge occurs between the discharge electrodes 25a and 25b in the chamber 22, the laser gas is excited, and the pulse laser light is amplified by the Fabry-Perot optical resonator including the output coupler OC and the rear mirror RM, and output via the output coupler OC.

The monitor module 30 measures the spectral linewidth, the center wavelength, and the pulse energy of the pulse laser light amplified by the excimer amplifier 20. The results of the measurement performed by the monitor module 30 are sent to the laser controller 40.

The laser controller 40 receives target pulse energy Et, a target spectral linewidth $\Delta\lambda t$, a target center wavelength $\lambda ct$, and a light emission trigger signal Tr from an exposure controller 82 of an exposure apparatus 80. The laser controller 40 controls the spectral linewidth of the laser light output from the first semiconductor laser 101 in such a way that a difference $\Delta\Delta\lambda$ between the spectral linewidth $\Delta\lambda$ of the pulse laser light measured by the linewidth monitor 35 and the target spectral linewidth $\Delta\lambda t$ decreases. Specifically, the laser controller 40 controls the value of the AC component of the current caused to flow through the semiconductor laser device of the first semiconductor laser 101 in such a way that $\Delta\Delta\lambda$ approaches zero.

The laser controller 40 may change the wavelength of the laser light output from the first semiconductor laser 101 in such a way that a difference $\delta\lambda c$ between a wavelength $\lambda c$ of the pulse laser light measured by the wavelength monitor 34 and the target center wavelength $\lambda ct$ decreases. Specifically, the laser controller 40 controls the value of the DC component of the current caused to flow through the first semiconductor laser 101 or the temperature of the semiconductor laser device in such a way that the difference $\delta\lambda c$ approaches zero.

The laser controller 40 calculates a difference $\Delta E$ between pulse energy E measured by the pulse energy monitor 36 and the target pulse energy Et. The laser controller 40 then controls the excimer amplifier 20 in such a way that the difference $\Delta E$ approaches zero.

1.3 Problems

[1] When an attempt is made to amplify the laser light output from the first semiconductor laser 101 with the first optical fiber amplifier 121, the narrow spectral linewidth of the laser light may cause stimulated Brillouin scattering (SBS), which may not allow amplification of the laser light to target power. Furthermore, the first semiconductor optical amplifier 111 and the first semiconductor laser 101 may be damaged by the SBS traveling in the opposite direction to the direction in which the laser light travels. To suppress the occurrence of SBS, it is necessary to provide a mechanism that widens the spectral linewidth of the laser light. Similarly, it is also necessary to provide a mechanism that widens the spectral linewidth of the laser light output from the second semiconductor laser 102, so that two mechanisms having the same function need to be provided. Since the two mechanisms each restrict the minimum spectral linewidth, the minimum spectral linewidth of the pulse laser light output from the laser system 2 undesirably widens.

[2] Optimum phase matching conditions (conditions on angle of incidence or crystal temperature) for the four nonlinear crystals, the LBO crystal 132, the first CLBO crystal 141, the second CLBO crystal 142, and the third CLBO crystal 143, vary on a center wavelength basis, and when any of the actual conditions deviates from the optimum phase matching condition, the pulse energy of the light having the converted wavelength decreases. When the center wavelength of the laser light output from the first semiconductor laser 101 is controlled by changing the wavelength of the laser light, the phase matching conditions for all the four crystals are affected, so that the center wavelength needs to be so controlled that the phase matching conditions for all the four crystals are satisfied.

2. First Embodiment

2.1 Configuration

Figure 2:
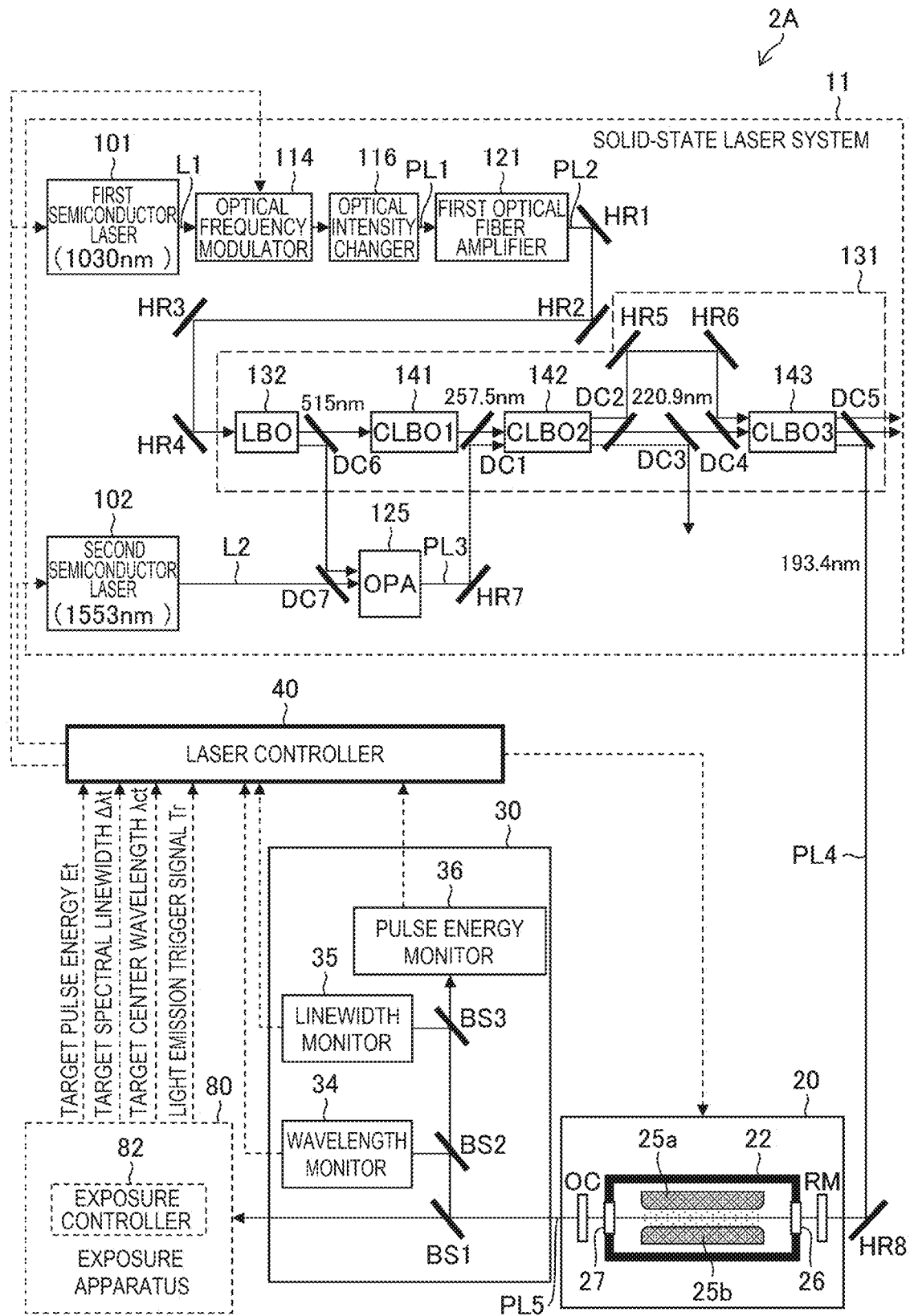
FIG. 2 schematically shows the configuration of a laser system according to a first embodiment.

FIG. 2 schematically shows the configuration of a laser system 2A according to a first embodiment. The laser system 2A shown in FIG. 2 will be described in terms of points different from those of the configuration shown in FIG. 1.

The laser system 2A includes a solid-state laser system 11 in place of the solid-state laser system 10 shown in FIG. 1. In the solid-state laser system 11, an optical frequency modulator 114 and an optical intensity changer 116 are disposed between the first semiconductor laser 101 and the first optical fiber amplifier 121, and the wavelength converter 130 shown in FIG. 1 is replaced with a wavelength converter 131. In the wavelength converter 131, a sixth dichroic mirror DC6 is disposed between the LBO crystal 132 and the first CLBO crystal 141.

In the solid-state laser system 11, the second semiconductor optical amplifier 112 and the second optical fiber amplifier 122 shown in FIG. 1 are replaced with a seventh dichroic mirror DC7 and an optical parametric amplifier (OPA) 125 including a periodically poled lithium niobate (PPLN) crystal.

The first semiconductor laser 101 in the solid-state laser system 11, for example, continuously oscillates at the wavelength of 1030 nm and oscillates in the single longitudinal mode, and outputs first laser light L1. The first semiconductor laser 101 may, for example, be a DFB-LD, a DBR-LD, or an external-cavity DBR laser. The first semiconductor laser 101 is an example of the "first laser" in the present disclosure.

The solid-state laser system 11 includes the optical intensity changer 116, which pulses the first laser light L1 output from the first semiconductor laser 101 and outputs first pulse laser light PL1. The optical intensity changer 116 may be a semiconductor optical amplifier (SOA) or an optical intensity modulator using an electro-optic effect. The optical intensity modulator using an electro-optic effect may be an optical shutter that is a combination of a Pockels cell and a polarizer, or may be a Mach-Zehnder optical intensity modulator.

In the solid-state laser system 11, the optical frequency modulator 114 is disposed between the first semiconductor laser 101 and the optical intensity changer 116. The optical frequency modulator 114 may, for example, be an acousto-optic (AO) frequency modulator using an AO device. The optical frequency modulator 114 may be replaced with an optical phase modulator. The optical phase modulator may, for example, be a phase modulator using an electro-optic effect. The optical frequency modulator 114 may be disposed downstream from the optical intensity changer 116. The optical frequency modulator 114 is an example of the "modulator" in the present disclosure.

The first optical fiber amplifier 121 amplifies the energy of the first pulse laser light PL1 output from the optical intensity changer 116 and outputs second pulse laser light PL2. When the energy is insufficient even after the amplification performed by the first optical fiber amplifier 121, a Yb-doped solid-state amplifier may be disposed downstream from the first optical fiber amplifier 121.

The second semiconductor laser 102 is, for example, a center-wavelength-variable laser having a center wavelength freely changeable between 1551 nm and 1555 nm, continuously oscillates at an instructed wavelength, oscillates in the single longitudinal mode, and outputs second laser light L2. The second semiconductor laser 102 may be a DFB-LD, a DBR-LD, or an external-cavity DBR laser. The DBR-LD may be an SG-DBR-LD (sampled grating distributed Bragg reflector laser diode) or an SSG-DBR-LD (super structure grating distributed Bragg reflector laser diode). The second semiconductor laser 102 is an example of the "second laser" in the present disclosure.

The seventh dichroic mirror DC7 is disposed upstream from the OPA 125, and is coated with a film that reflects the pulse laser light having the wavelength of 1030 nm (second pulse laser light PL2) at high reflectance and transmits the pulse laser light having the wavelength of 1553 nm from the second semiconductor laser 102 (second laser light L2) at high transmittance.

The OPA 125 pulses and amplifies the second laser light L2 and outputs third pulse laser light PL3. The OPA 125 may include plural OPAs 125 for amplification as follows: plural PPLN crystals are provided; a partially reflective mirror that splits the pulse laser light having the wavelength of 1030 nm is disposed between the sixth dichroic mirror DC6 and the seventh dichroic mirror DC7; and dichroic mirrors are disposed between the PPLN crystals disposed in series so that the split pulse laser light having the wavelength of 1030 nm is input to each of the PPLN crystals.

The wavelength converter 131 includes the LBO crystal 132, the sixth dichroic mirror DC6, the first CLBO crystal 141, the first dichroic mirror DC1, the second CLBO crystal 142, the second dichroic mirror DC2, the third dichroic mirror DC3, the fourth dichroic mirror DC4, the fifth highly reflective mirror HR5, the sixth highly reflective mirror HR6, the third CLBO crystal 143, and the fifth dichroic mirror DC5.

The LBO crystal 132 is so disposed that the pulse laser light having the wavelength of 1030 nm and output from the first optical fiber amplifier 121 (second pulse laser light PL2) is incident on the LBO crystal 132.

The sixth dichroic mirror DC6 is disposed between the LBO crystal 132 and the first CLBO crystal 141 and is coated with a film that reflects the pulse laser light having the wavelength of 1030 nm (second pulse laser light PL2) at high reflectance and transmits the pulse laser light having the wavelength 515 nm from the LBO crystal 132 (first harmonic light) at high transmittance.

The seventh dichroic mirror DC7 and the OPA 125 are so disposed that the seventh dichroic mirror DC7 combines the pulse laser light having the wavelength of 1030 nm and reflected off the sixth dichroic mirror DC6 (second pulse laser light PL2) with the laser light having the wavelength of 1553 nm from the second semiconductor laser 102 (second laser light L2), and that the combined light is incident on the OPA 125. Instead, the sixth dichroic mirror DC6 may not be disposed, the fourth highly reflective mirror HR4 may be replaced with a beam splitter, and the seventh dichroic mirror DC7 and the OPA 125 may be so disposed that the pulse laser light having passed through the beam splitter (second pulse laser light PL2) undergoes the light combination at the seventh dichroic mirror DC7, and that the combined light is incident on the OPA 125.

The first CLBO crystal 141 may be so disposed that the pulse laser light having the wavelength of 515 nm from the LBO crystal 132 (first harmonic light) is incident on the first CLBO crystal 141.

The first dichroic mirror DC1 may be disposed between the first CLBO crystal 141 and the second CLBO crystal 142 and may be coated with a film that reflects the pulse laser light having the wavelength of 1553 nm from the OPA 125 (third pulse laser light PL3) at high reflectance and transmits the pulse laser light having the wavelength of 257.5 nm from the first CLBO crystal 141 (second harmonic light) at high transmittance. Instead, the first dichroic mirror DC1 may be disposed between the sixth dichroic mirror DC6 and the first CLBO crystal 141 and may be coated with a film that reflects the pulse laser light having the wavelength of 1553 nm from the OPA 125 (third pulse laser light PL3) at high reflectance and transmits the pulse laser light having the wavelength 515 nm from the sixth dichroic mirror DC6 (second harmonic light) at high transmittance.

The second CLBO crystal 142 may be so disposed that the pulse laser light having the wavelength of 257.5 nm and having passed through the first dichroic mirror DC1 (second harmonic light) and the pulse laser light having the wavelength of 1553 nm and having been reflected off the first dichroic mirror DC1 (third pulse laser light PL3) are incident on the second CLBO crystal 142. The second CLBO crystal 142 may be disposed on a rotary stage that is not shown and configured to be capable of changing the angle of incidence for the crystal and the temperature of the crystal to match the phase matching condition.

The second dichroic mirror DC2 may be disposed between the second CLBO crystal 142 and the third dichroic mirror DC3 and may be coated with a film that reflects the pulse laser light having the wavelength of 1553 nm from the second CLBO crystal 142 (third pulse laser light PL3) at high reflectance and transmits the pulse laser light having the wavelength of 257.5 nm from the first CLBO crystal 141 (second harmonic light) and the pulse laser light having the wavelength of 220.9 nm (first sum-frequency light) at high transmittance.

The third dichroic mirror DC3 may be disposed between the second dichroic mirror DC2 and the fourth dichroic mirror DC4 and may be coated with a film that reflects the pulse laser light having the wavelength of 257.5 nm from the second dichroic mirror DC2 (second harmonic light) at high reflectance and transmits the pulse laser light having the wavelength of 220.9 nm (first sum-frequency light) at high transmittance.

The fourth dichroic mirror DC4 may be disposed between the third dichroic mirror DC3 and the third CLBO crystal 143 and may be coated with a film that reflects the pulse laser light having the wavelength of 1553 nm from the sixth highly reflective mirror HR6 (third pulse laser light PL3) at high reflectance and transmits the pulse laser light having the wavelength of 220.9 nm from the third dichroic mirror DC3 (first sum–frequency light) at high transmittance.

The third CLBO crystal 143 is so disposed that the pulse laser light having the wavelength of 220.9 nm from the fourth dichroic mirror DC4 (first sum-frequency light) and the pulse laser light having the wavelength of 1553 nm (third pulse laser light PL3) are incident on the third CLBO crystal 143. The third CLBO crystal 143 may be disposed on a rotary stage that is not shown and configured to be capable of changing the angle of incidence for the crystal and the temperature of the crystal to match the phase matching condition.

The fifth dichroic mirror DC5 may be disposed between the third CLBO crystal 143 and the excimer amplifier 20 and may be coated with a film that reflects the pulse laser light having the wavelength of 193.4 nm from the third CLBO crystal 143 (second sum-frequency light, fourth pulse laser light PL4) at high reflectance and transmits the pulse laser light having the wavelength of 220.9 nm (first sum-frequency light) and the pulse laser light having the wavelength of 1553 nm (third pulse laser light PL3) at high transmittance.

The LBO crystal 132 is an example of the "first nonlinear crystal" in the present disclosure. The first CLBO crystal 141 is an example of the "second nonlinear crystal" in the present disclosure, and the second CLBO crystal 142 and the third CLBO crystal 143 are examples of the "third nonlinear crystal" and the "fourth nonlinear crystal" in the present disclosure.

The laser controller 40 is implemented by a processor. The processor in the present disclosure is a processing apparatus including a storage that stores a control program and a CPU (central processing unit) that executes the control program. The processor is particularly configured or programmed to carry out a variety of processes contained in the present disclosure. The processor may include an integrated circuit represented by an FPGA (field programmable gate array) and an ASIC (application specific integrated circuit). Note that the functions of the laser controller 40 may be achieved by plural processors.

The configurations of the excimer amplifier 20 and the monitor module 30 in the laser system 2A may be the same as those in FIG. 1.

2.2 Operation

The laser controller 40 keeps the first semiconductor laser 101 and the second semiconductor laser 102 continuously oscillating. The first laser light L1 output from the first semiconductor laser 101 is modulated in terms of wavelength (frequency) by the optical frequency modulator 114 in accordance with a modulation signal received from the laser controller 40, so that the spectral linewidth of the first laser light L1 widens in accordance with the principle of the frequency modulation.

The optical intensity changer 116 pulses the continuous-wave laser light having the wavelength of 1030 nm and output from the optical frequency modulator 114 (first laser light L1). The pulse laser light having undergone the pulsing operation (first pulse laser light PL1) has a pulse width ranging, for example, from 10 ns to 40 ns.

The first pulse laser light PL1 output from the optical intensity changer 116 enters the first optical fiber amplifier 121, which amplifies the first pulse laser light PL1 and outputs the second pulse laser light PL2.

The second pulse laser light PL2 amplified by the first optical fiber amplifier 121 enters the LBO crystal 132. The LBO crystal 132 is so adjusted by a rotary stage that is not shown that the angle of incidence of the pulse laser light having the wavelength of 1030 nm (second pulse laser light PL2) satisfies the phase matching condition for generation of the second harmonic of the light having the wavelength of 1030 nm. As a result, the pulse laser light having the wavelength of 515 nm (first harmonic light), which is the second harmonic of the pulse laser light having the wavelength of 1030 nm (second pulse laser light PL2), is generated.

The pulse laser light having the wavelength of 515 nm (first harmonic light) enters the first CLBO crystal 141. The first CLBO crystal 141 is so adjusted that the angle of incidence of the pulse laser light having the wavelength of 515 nm (first harmonic light) satisfies the phase matching condition for generation of the second harmonic of the light having the wavelength of 515 nm. As a result, the pulse laser light having the wavelength of 257.5 nm (second harmonic light), which is the second harmonic of the pulse laser light having the wavelength of 515 nm (first harmonic light), is generated.

The seventh dichroic mirror DC7 combines the pulse laser light having the wavelength of 1030 nm reflected off the sixth dichroic mirror DC6 (second pulse laser light PL2) with the laser light having the wavelength of 1553 nm and output from the second semiconductor laser 102 (second laser light L2), and the combined light enters the OPA 125. The OPA 125 uses optical parametric amplification to generate and amplify the pulse laser light having the wavelength of 1553 nm (third pulse laser light PL3), which has a pulse width equal to or slightly shorter than that of the pulse laser light having the wavelength of 1030 nm (second pulse laser light PL2). That is, the OPA 125 pulses the continuous-wave laser light output from the second semiconductor laser 102.

The third pulse laser light PL3 output from the OPA 125 is incident on the first dichroic mirror DC1 via the seventh highly reflective mirror HR7. The pulse laser light having the wavelength of 257.5 nm and output from the first CLBO crystal 141 (second harmonic light) and the pulse laser light having the wavelength of 1553 nm and output from the OPA 125 (third pulse laser light PL3) are combined with each other by the first dichroic mirror DC1 and enters the second CLBO crystal 142.

The second CLBO crystal 142 is so adjusted that the angles of incidence of the pulse laser light having the wavelength of 257.5 nm (second harmonic light) and the pulse laser light having the wavelength of 1553 nm (third pulse laser light PL3) satisfy the phase matching condition for generation of sum-frequency light. As a result, the pulse laser light having the wavelength of 220.9 nm (first sum-frequency light), which is the sum-frequency light generated by the pulse laser light having the wavelength of 257.5 nm (second harmonic light) and the pulse laser light having the wavelength of 1553 nm (third pulse laser light PL3), is generated. Note that the second CLBO crystal 142 outputs the pulse laser light having the wavelength of 257.5 nm (second harmonic light) and the pulse laser light having the wavelength of 1553 nm (third pulse laser light PL3) as well as the pulse laser light having the wavelength of 220.9 nm (first sum-frequency light).

The pulse laser light having the wavelength of 257.5 nm (second harmonic light) is reflected off the third dichroic mirror DC3, and deviates from the optical path. The pulse laser light having the wavelength of 220.9 nm (first sum-frequency light) and the pulse laser light having the wavelength of 1553 nm (third pulse laser light PL3) enter the third CLBO crystal 143. The third CLBO crystal 143 is so adjusted that the angles of incidence of the pulse laser light having the wavelength of 220.9 nm (first sum-frequency light) and the pulse laser light having the wavelength of 1553 nm (third pulse laser light PL3) satisfy the phase matching condition for generation of sum-frequency light. As a result, the pulse laser light having the wavelength of 193.4 nm (second sum-frequency light, fourth pulse laser light PL4), which is the sum-frequency light generated by the pulse laser light having the wavelength of 220.9 nm (first sum-frequency light) and the pulse laser light having the wavelength of 1553 nm (third pulse laser light PL3), is generated.

The pulse laser light having the wavelength of 193.4 nm and reflected off the fifth dichroic mirror DC5 at high reflectance (fourth pulse laser light PL4) enters the excimer amplifier 20.

At the timing when the fourth pulse laser light PL4 having passed through the rear mirror RM enters the chamber 22, a power supply that is not shown applies high-voltage pulses to the space between the discharge electrodes 25a and 25b in the chamber 22. When discharge occurs between the discharge electrodes 25a and 25b in the chamber 22, the laser gas is excited, and the fourth pulse laser light PL4 is amplified by the Fabry-Perot optical resonator including the output coupler OC and the rear mirror RM, and fifth pulse laser light PL5 is output via the output coupler OC. The excimer amplifier 20 is an example of the "amplification section" in the present disclosure.

The monitor module 30 measures the spectral linewidth, the center wavelength, and the pulse energy of the fifth pulse laser light PL5 output from the excimer amplifier 20.

The laser controller 40 receives the target pulse energy Et, the target spectral linewidth $\Delta\lambda t$, the target center wavelength $\lambda ct$, and the light emission trigger signal Tr from the exposure controller 82 of the exposure apparatus 80. The exposure apparatus 80 is an example of the "external apparatus" in the present disclosure. The laser controller 40 determines and outputs the modulation signal to the optical frequency modulator 114 in such a way that the difference $\Delta\Delta\lambda$ between the spectral linewidth $\Delta\lambda$ of the fifth pulse laser light PL5 measured by the linewidth monitor 35 and the target spectral linewidth $\Delta\lambda t$ decreases. In this case, the value of the AC component of the current caused to flow through the semiconductor laser device of the first semiconductor laser 101 is not controlled.

The first laser light L1 output from the first semiconductor laser 101 is modulated in terms of wavelength (frequency) by the optical frequency modulator 114 in accordance with the received modulation signal, so that the spectral linewidth of the first laser light L1 widens in accordance with the principle of the frequency modulation.

Furthermore, the laser controller 40 calculates the difference $\delta\lambda c$ between the wavelength $\lambda c$ of the fifth pulse laser light PL5 measured by the wavelength monitor 34 and the target center wavelength $\lambda ct$. The laser controller 40 then determines and outputs a control signal that reduces the difference $\delta\lambda c$ to the second semiconductor laser 102.

The second semiconductor laser 102, when it is, for example, an SG-DBR-LD or an SSG-DBR-LD, may control the amount of adjustment of the current to each diffraction grating or the current to the phase adjustment region to change the center wavelength of the second laser light L2 to be output. Instead, when the second semiconductor laser 102 is an external-cavity DBR laser, the center wavelength of the second laser light L2 to be output may be changed by controlling the angle and position of the diffraction grating or the mirror that constitutes the cavity in accordance with the received control signal. Note that in the cases described above, the variable control is not performed on the value of the DC component of the current caused to flow through the active layer of the semiconductor laser device of the second semiconductor laser 102 or the temperature of the semiconductor laser device.

The spectral linewidth control and the center wavelength control described above may be performed for each of the pulses as in the wavelength control, or may be performed for each of a predetermined number of pulses. Moreover, the wavelength control and the spectral linewidth control may be performed in parallel independently from each other, or may be performed in series alternately.

The laser controller 40 changes the angles of rotation of the second CLBO crystal 142 and the third CLBO crystal 143 in accordance with the target center wavelength $\lambda ct$ to adjust the angle of incidence of the incident light for phase matching. Instead, the laser controller 40 changes the crystal temperatures of the second CLBO crystal 142 and the third CLBO crystal 143 to make the adjustment for phase matching.

2.3 Example of Spectral Linewidth Control

Figure 3:
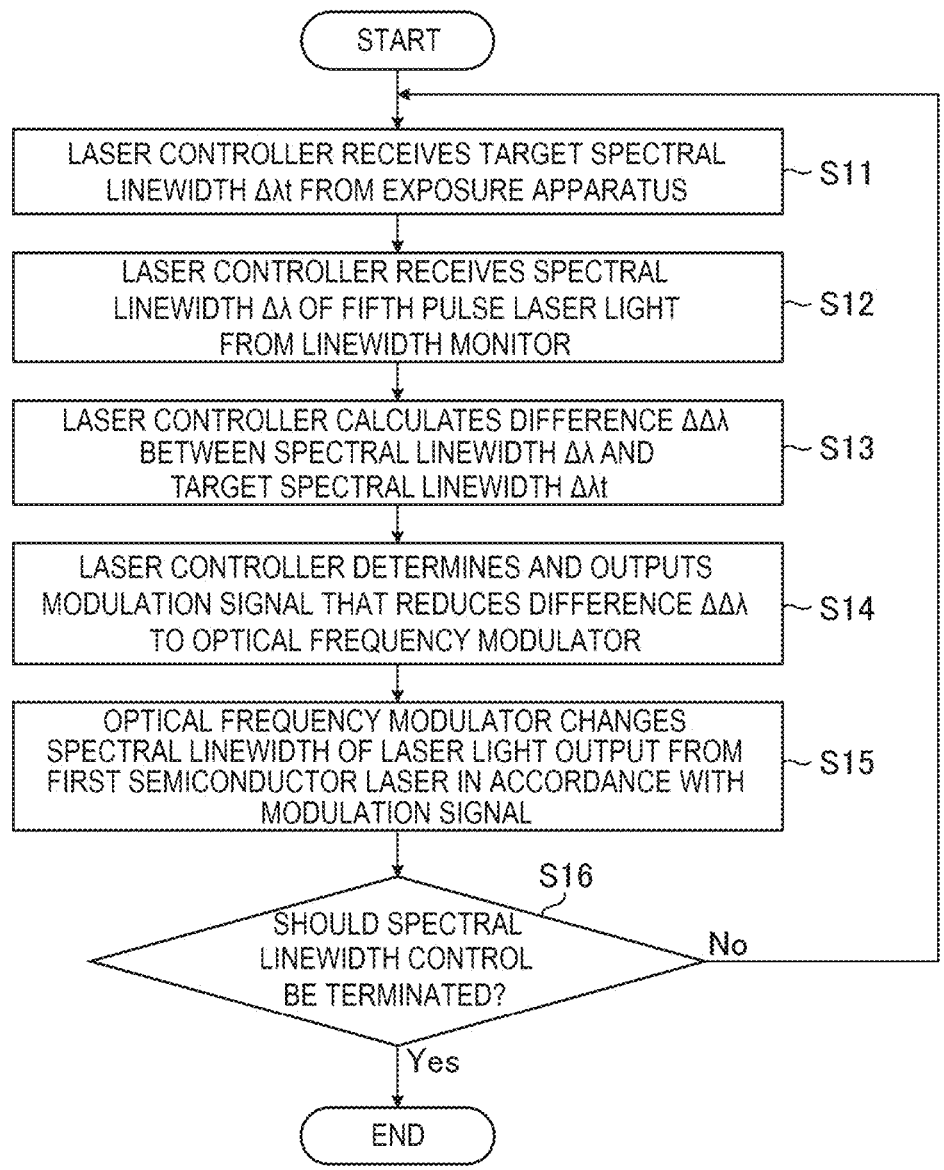
FIG. 3 is a flowchart showing an example of spectral linewidth control performed in the laser system according to the first embodiment.

FIG. 3 is a flowchart showing an example of the spectral linewidth control performed in the laser system 2A according to the first embodiment.

In step S11, the laser controller 40 receives the target spectral linewidth $\Delta\lambda t$ from the exposure apparatus 80.

In step S12, the laser controller 40 receives the spectral linewidth $\Delta\lambda$ of the fifth pulse laser light PL5 from the linewidth monitor 35.

In step S13, the laser controller 40 calculates the difference $\Delta\Delta\lambda$ between the spectral linewidth $\Delta\lambda$ and the target spectral linewidth $\Delta\lambda t$.

In step S14, the laser controller 40 determines and outputs the modulation signal that reduces the difference $\Delta\Delta\lambda$ to the optical frequency modulator 114.

In step S15, the optical frequency modulator 114 changes the spectral linewidth of the first laser light L1 output from the first semiconductor laser 101 in accordance with the modulation signal.

In step S16, the laser controller 40 evaluates whether the spectral linewidth control should be terminated. When the result of the evaluation in step S16 is No, the laser controller 40 returns to step S11 and repeats steps S11 to S16. When the result of the evaluation in step S16 is Yes, the laser controller 40 terminates the flowchart of FIG. 3.

2.4 Example of Center Wavelength Control

Figure 4:
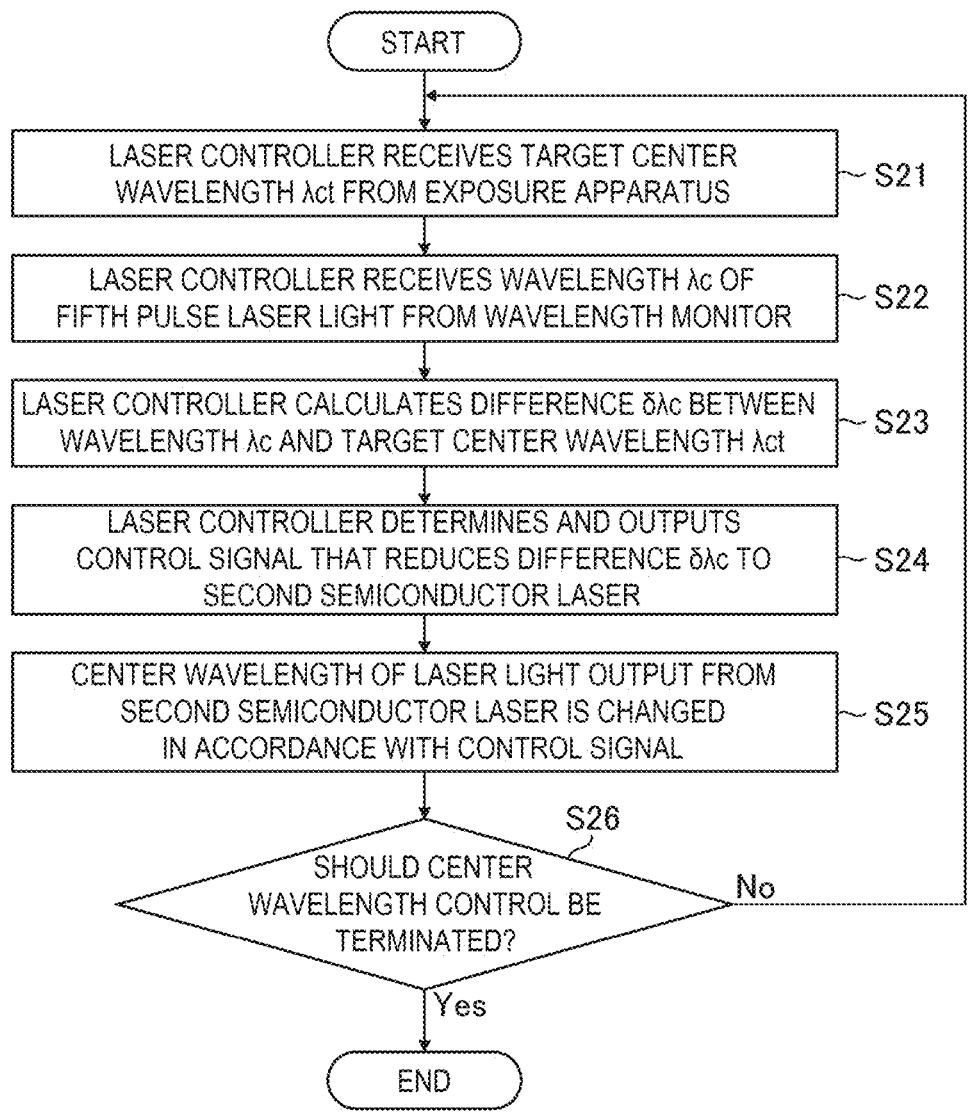
FIG. 4 is a flowchart showing an example of center wavelength control performed in the laser system according to the first embodiment.

FIG. 4 is a flowchart showing an example of the center wavelength control performed in the laser system 2A according to the first embodiment.

In step S21, the laser controller 40 receives the target center wavelength $\lambda ct$ from the exposure apparatus 80. In step S22, the laser controller 40 receives the wavelength $\lambda c$ of the fifth pulse laser light PL5 from the wavelength monitor 34.

In step S23, the laser controller 40 calculates the difference $\delta\lambda c$ between the wavelength $\lambda c$ and the target center wavelength $\lambda ct$.

In step S24, the laser controller 40 determines and outputs the control signal that reduces the difference $\delta\lambda c$ to the second semiconductor laser 102.

In step S25, the center wavelength of the second laser light L2 output from the second semiconductor laser 102 is changed in accordance with the control signal.

In step S26, the laser controller 40 evaluates whether the spectral linewidth control should be terminated. When the result of the evaluation in step S26 is No, the laser controller 40 returns to step S21 and repeats steps S21 to S26. When the result of the evaluation in step S26 is Yes, the laser controller 40 terminates the flowchart of FIG. 4.

2.5 Effects

According to the first embodiment, the second laser light L2 output from the second semiconductor laser 102 is not amplified by using an optical fiber amplifier, so that there is no need to suppress SBS. There is therefore no need to provide a mechanism that widens the spectral linewidth of the second laser light L2 output from the second semiconductor laser 102.

Furthermore, the minimum spectral linewidth of the fifth pulse laser light PL5 output from the laser system 2A according to the first embodiment is restricted only by the mechanism that widens the spectral linewidth of the first laser light L1. The spectral linewidth of the fifth pulse laser light PL5 can be controlled by the spectral linewidth widening mechanism described above.

According to the first embodiment, the center wavelength of the laser light only from the second semiconductor laser 102 is controlled. In this case, only two nonlinear crystals, the second CLBO crystal 142 and the third CLBO crystal 143, affect the optimum phase matching conditions. Only the two nonlinear crystals therefore require controlled phase matching conditions when the center wavelength is controlled.

The configuration of the wavelength converter 131 in the first embodiment twice generates the second harmonic of the second pulse laser light PL2, which is the pulsed and amplified first laser light L1, and twice generates the sum-frequency light generated by the generated harmonic light and the third pulse laser light PL3, which is the pulsed and amplified second laser light L2. In the thus configured wavelength converter 131, the ratio of the amount of change in the spectral linewidth of the fifth pulse laser light PL5 to the amount of change in the spectral linewidth of the first laser light L1 output from the first semiconductor laser 101 (linewidth change sensitivity) is approximately 4.6 times greater than the ratio achieved when the spectral linewidth of the second laser light L2 output from the second semiconductor laser 102 is changed. Controlling the spectral linewidth of the first laser light L1 output from the first semiconductor laser 101 or the spectral linewidth of the first pulse laser light PL1 by using the optical frequency modulator 114 therefore allows the adjustment of the spectral linewidth over a wider range than the range achieved by controlling the spectral linewidth of the second laser light L2 output from the second semiconductor laser 102.

The method for controlling the center wavelength of the light from an SG-DBR-LD or an SSG-DBR-LD provides a wider control range than the method for controlling the center wavelength by using the value of the DC component of the current caused to flow through the active layer of a normal semiconductor laser device, and provides a wider control range and a faster response speed than the method for controlling the center wavelength by controlling the temperature of the semiconductor laser device.

2.6 Variations 2.6.1 Configuration

Figure 5:
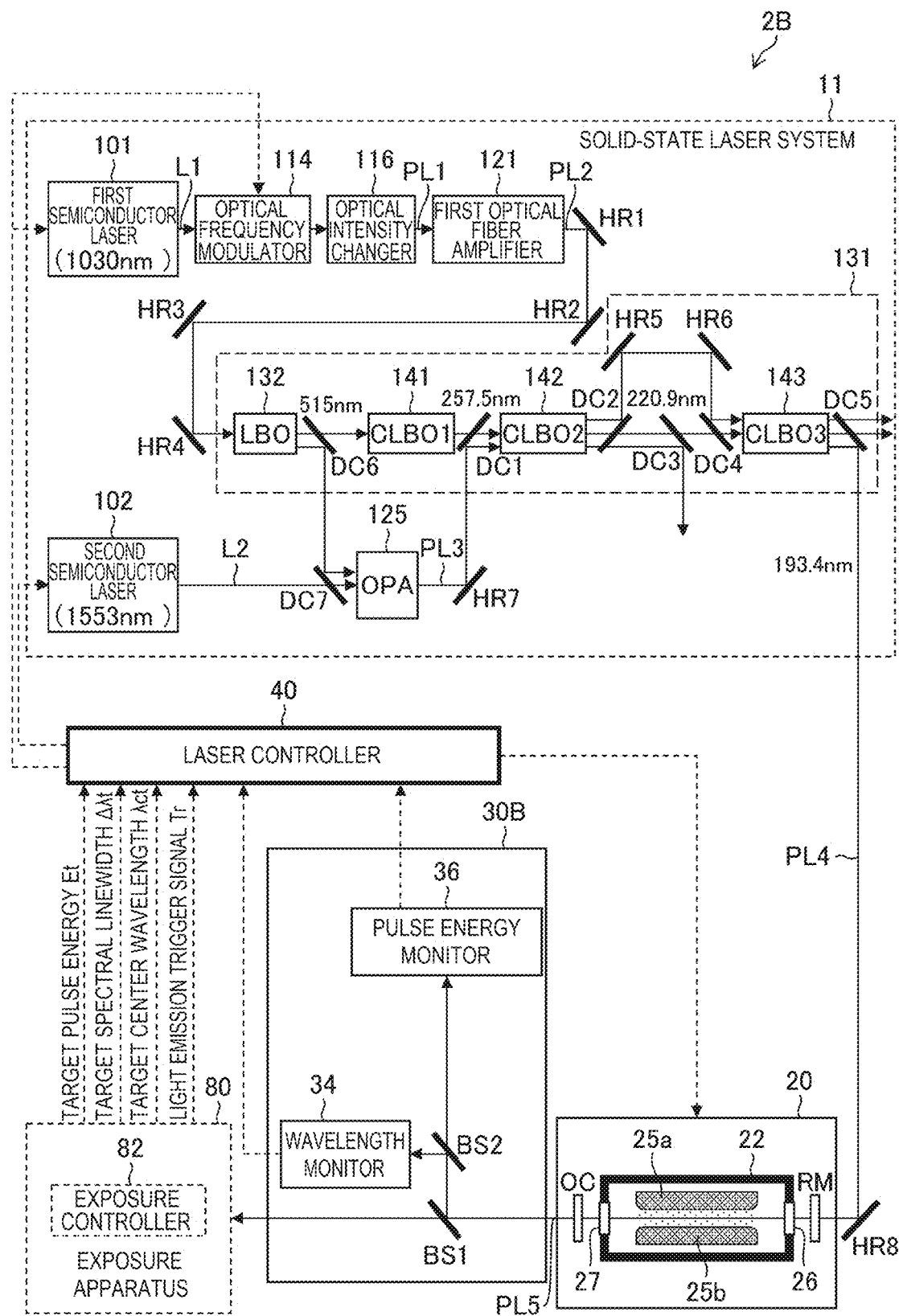
FIG. 5 schematically shows the configuration of a laser system according to a first variation of the first embodiment.

FIG. 5 schematically shows the configuration of a laser system 2B according to a variation of the first embodiment. Differences in configuration between FIGS. 5 and 2 will be described.

The laser system 2B includes a monitor module 30B in place of the monitor module 30 in FIG. 2. The monitor module 30B differs from the monitor module 30 in FIG. 2 in that neither the third beam splitter BS3 nor the linewidth monitor 35 is disposed in the monitor module 30B. The other configurations may be the same as those in FIG. 2.

2.6.2 Operation

The laser controller 40 stores relationship data representing the relationship between the spectral linewidth and the modulation signal to the optical frequency modulator 114. The relationship data is stored, for example, as a function or a table representing the relationship (correspondence) between the spectral linewidth and the modulation signal.

The laser controller 40 determines a modulation signal corresponding to the target spectral linewidth $\Delta\lambda t$ from the target spectral linewidth $\Delta\lambda t$ and the function or table that defines the relationship between the spectral linewidth and the modulation signal to the optical frequency modulator 114. The laser controller 40 outputs the determined modulation signal to the optical frequency modulator 114.

The spectral linewidth of the first laser light L1 input to the optical frequency modulator 114 is widened in accordance with the modulation signal. When the target spectral linewidth $\Delta\lambda t$ instructed by the exposure apparatus 80 is changed, the laser controller 40 determines the modulation signal from the target spectral linewidth $\Delta\lambda t$ and the function or table representing the relationship between the spectral linewidth and the modulation signal to the optical frequency modulator 114, and outputs the determined modulation signal to the optical frequency modulator 114. The other operations may be the same as those in the first embodiment.

2.6.3 Example of Spectral Linewidth Control

Figure 6:
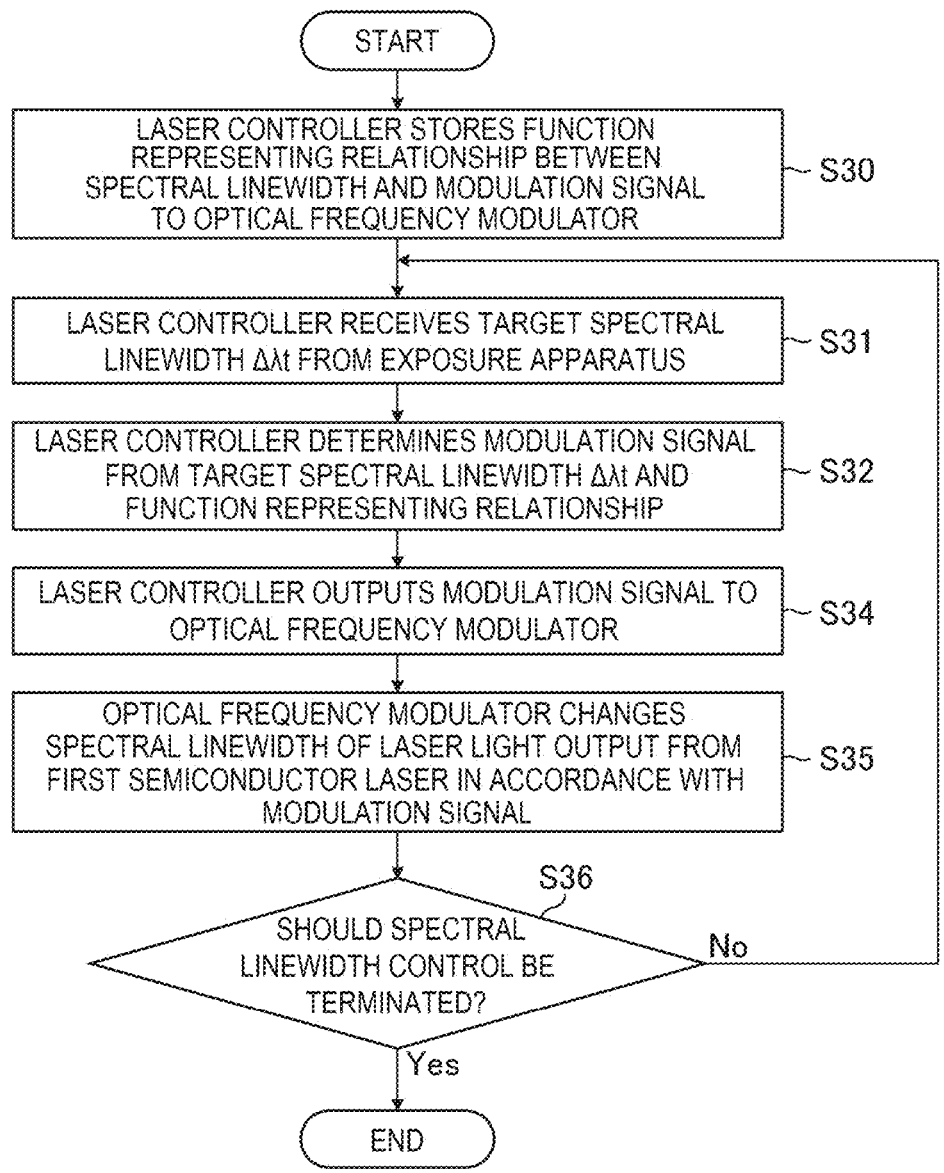
FIG. 6 is a flowchart showing an example of spectral linewidth control performed in the laser system according to the first variation of the first embodiment.

FIG. 6 is a flowchart showing an example of the spectral linewidth control performed in the laser system 2B according to the variation of the first embodiment.

In step S30, the laser controller 40 stores the function representing the relationship between the spectral linewidth and the modulation signal to the optical frequency modulator 114. Note that a table may be stored in place of the function.

In step S31, the laser controller 40 receives the target spectral linewidth $\Delta\lambda t$ from the exposure apparatus 80.

In step S32, the laser controller 40 determines the modulation signal corresponding to the target spectral linewidth $\Delta\lambda t$ from the target spectral linewidth $\Delta\lambda t$ and the function representing the relationship.

In step S34, the laser controller 40 outputs the modulation signal to the optical frequency modulator 114.

In step S35, the optical frequency modulator 114 changes the spectral linewidth of the first laser light L1 output from the first semiconductor laser 101 in accordance with the modulation signal.

In step S36, the laser controller 40 evaluates whether the spectral linewidth control should be terminated. When the result of the evaluation in step S36 is No, the laser controller 40 returns to step S31 and repeats steps S31 to S36. When the result of the evaluation in step S36 is Yes, the laser controller 40 terminates the flowchart of FIG. 6.

2.6.4 Effects

The laser system 2B according to the variation of the first embodiment can readily control the spectral linewidth. Furthermore, the monitor module 30B does not need to measure the spectral linewidth of the fifth pulse laser light PL5.

3. Second Embodiment 3.1 Configuration

Figure 7:
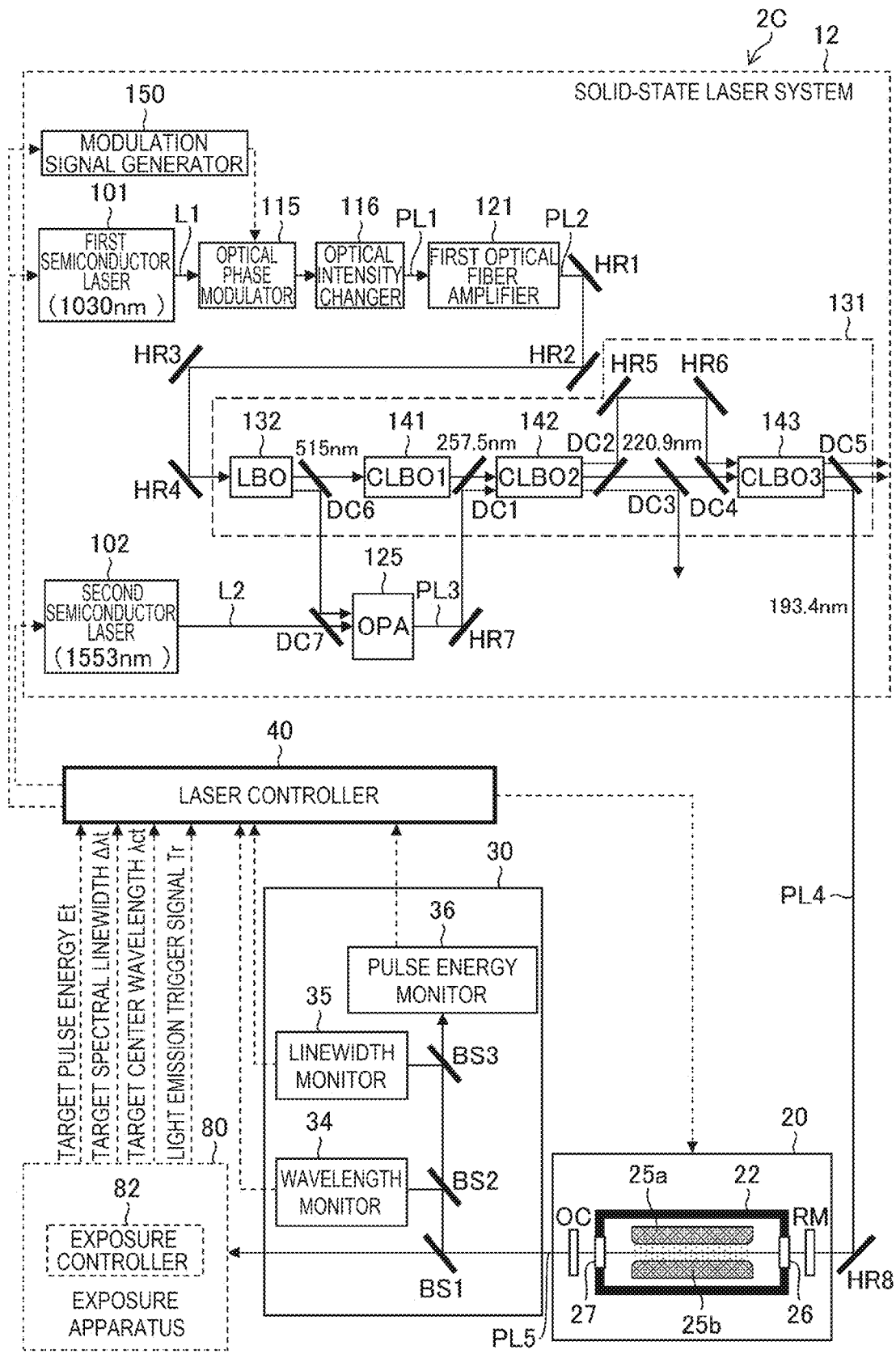
FIG. 7 schematically shows the configuration of a laser system according to a second embodiment.

FIG. 7 schematically shows the configuration of a laser system 2C according to a second embodiment. Differences in configuration between FIGS. 7 and 2 will be described.

The laser system 2C includes a solid-state laser system 12 in place of the solid-state laser system 11. The solid-state laser system 12 includes an optical phase modulator 115 and a modulation signal generator 150 in place of the optical frequency modulator 114. The optical phase modulator 115 is an example of the "modulator" in the present disclosure. The optical phase modulator 115 may be disposed between the first semiconductor laser 101 and the optical intensity changer 116 as shown in FIG. 7, or between the optical intensity changer 116 and the first optical fiber amplifier 121. The other configurations may be the same as those in the first embodiment.

Figure 8:
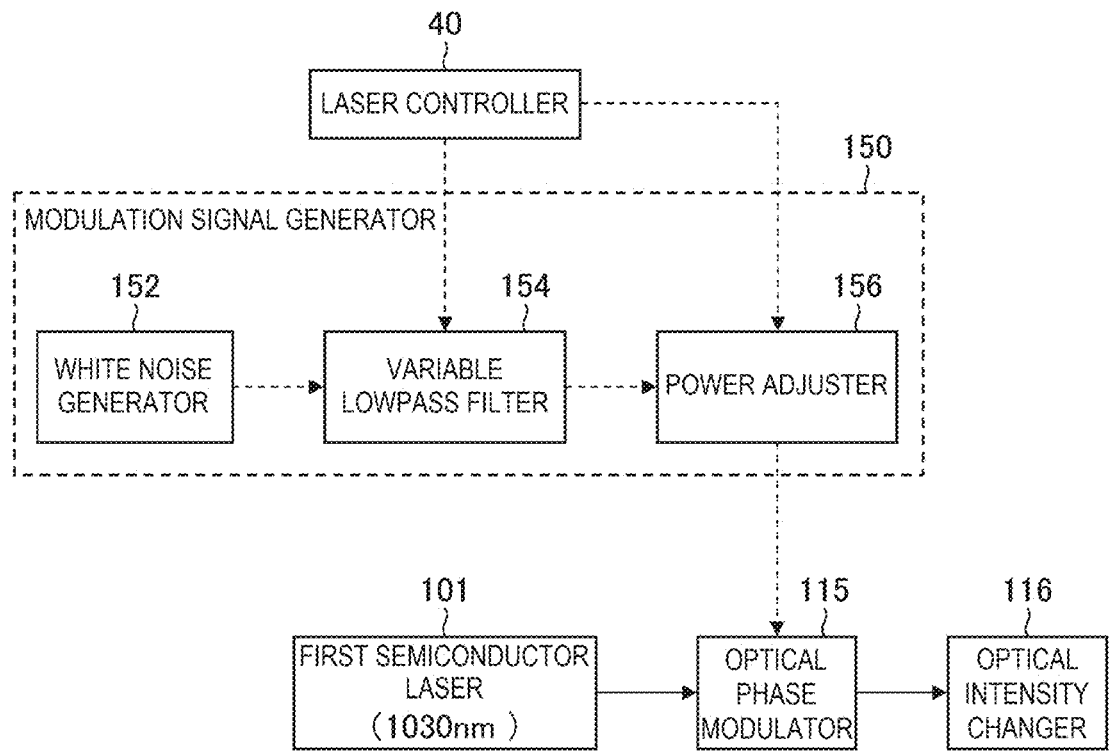
FIG. 8 is a block diagram showing the configuration of a modulation signal generator.

FIG. 8 shows the modulation signal generator 150 in detail. The modulation signal generator 150 includes a white noise generator 152, a variable lowpass filter 154, and a power adjuster 156. The white noise generator 152 may be a noise source module or any other white noise generator. The variable lowpass filter 154 allows low-frequency components of the signal generated by the white noise generator 152 to pass therethrough and blocks high-frequency components of the signal. The power adjuster 156 adjusts the signal having passed through the variable lowpass filter 154 to a signal having appropriate power. The power adjuster 156 may be implemented by, for example, an attenuator, an amplifier, or the combination of an attenuator and an amplifier.

3.2 Operation

The laser controller 40 receives the target spectral linewidth $\Delta\lambda t$ from the exposure apparatus 80. The white noise generator 152 generates white noise. The laser controller 40 calculates the difference $\Delta\Delta\lambda$ between the spectral linewidth $\Delta\lambda$ of the pulse laser light measured by the linewidth monitor 35 and the target spectral linewidth $\Delta\lambda t$. The laser controller 40 then determines a band control signal to be transmitted to the variable lowpass filter 154 and an attenuation rate control signal or an amplification rate control signal to be transmitted to the power adjuster 156 in such a way that the signals reduce the difference $\Delta\Delta\lambda$, and outputs the signals.

The variable lowpass filter 154 allows low-frequency-side signals of the white noise signal to pass therethrough in accordance with the band control signal. The power of the signals having passed through the variable lowpass filter 154 is so adjusted by the power adjuster 156 that the power attenuated by the variable lowpass filter 154 is compensated.

The white noise signal adjusted by the power adjuster 156 in terms of power is input to the optical phase modulator 115.

The spectral linewidth of the first laser light L1 output from the first semiconductor laser 101 is widened in accordance with the band of the white noise signal input to the optical phase modulator 115.

Figure 9:
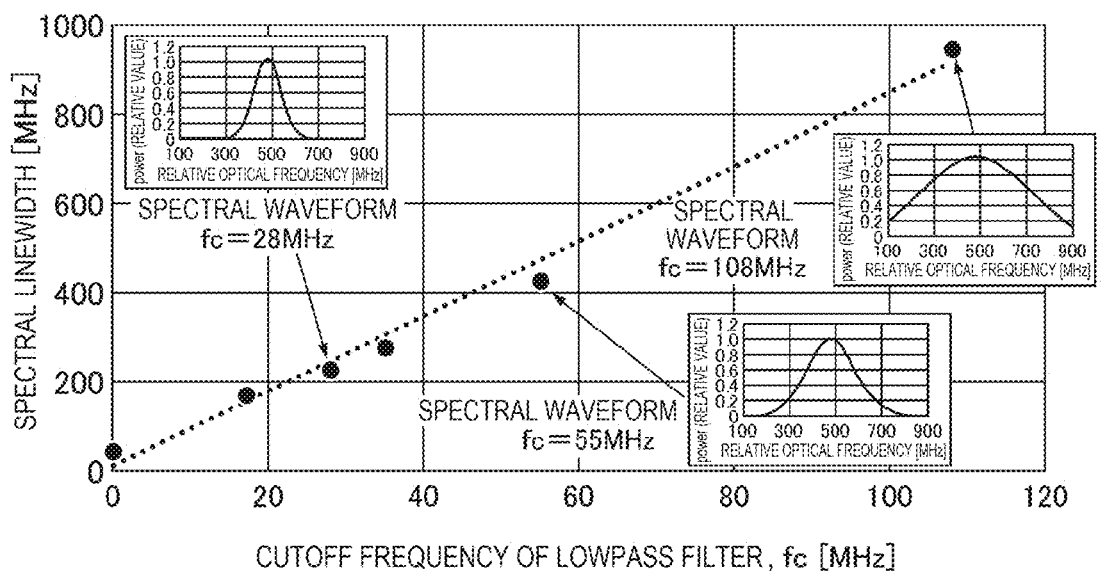
FIG. 9 is a graph showing the spectral linewidth of laser light output from an optical phase modulator when a cutoff frequency fc of a variable lowpass filter is changed, and typical spectrum shapes.

FIG. 9 shows the spectral linewidths of the laser light output from the optical phase modulator 115 and typical spectrum shapes when a cutoff frequency fc of the variable lowpass filter 154 is changed. The laser light output from the optical phase modulator 115 in the second embodiment may have a spectral shape close to a Gaussian distribution, as shown in FIG. 9.

Even when only the power of the white noise signal to be input to the optical phase modulator 115 is changed by the power adjuster 156, the spectral linewidth of the laser light output from the optical phase modulator 115 slightly changes, so that the power adjuster 156 can make fine adjustment of the spectral linewidth.

3.3 Example of Spectral Linewidth Control

Figure 10:
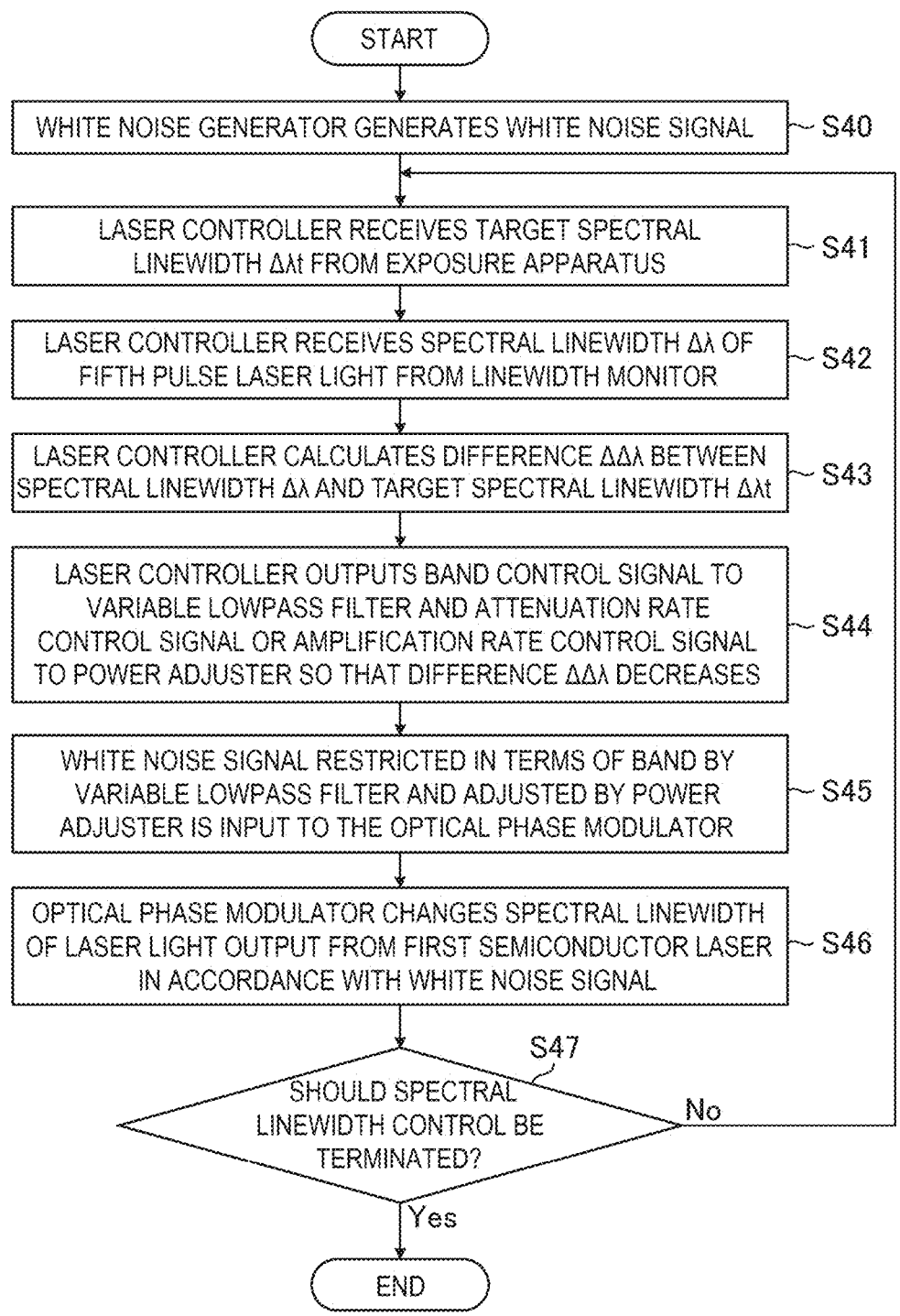
FIG. 10 is a flowchart showing an example of the spectral linewidth control applied to the laser system according to the second embodiment.

FIG. 10 is a flowchart showing an example of the spectral linewidth control applied to the laser system 2C according to the second embodiment.

In step S40, the modulation signal generator 150 causes the white noise generator 152 to generate the white noise signal.

In step S41, the laser controller 40 receives the target spectral linewidth $\Delta\lambda t$ from the exposure apparatus 80.

In step S42, the laser controller 40 receives the spectral linewidth $\Delta\lambda$ of the fifth pulse laser light PL5 from the linewidth monitor 35.

In step S43, the laser controller 40 calculates the difference $\Delta\Delta\lambda$ between the spectral linewidth $\Delta\lambda$ and the target spectral linewidth $\Delta\lambda t$.

In step S44, the laser controller 40 outputs the band control signal to the variable lowpass filter 154 and the attenuation rate control signal or the amplification rate control signal to the power adjuster 156 so that the difference $\Delta\Delta\lambda$ decreases.

In step S45, the white noise signal having the band restricted by the variable lowpass filter 154 and adjusted by the power adjuster 156 is input to the optical phase modulator 115. Thereafter, in step S46, the optical phase modulator 115 changes the spectral linewidth of the first laser light L1 output from the first semiconductor laser 101 in accordance with the white noise signal.

In step S47, the laser controller 40 evaluates whether the spectral linewidth control should be terminated. When the result of the evaluation in step S47 is No, the laser controller 40 returns to step S41 and repeats steps S41 to S47. When the result of the evaluation in step S47 is Yes, the laser controller 40 terminates the flowchart of FIG. 10.

3.4 Effects

According to the second embodiment, when white noise is applied to the optical phase modulator 115, the spectral linewidth can be widened with the spectral shape being close to a Gaussian distribution (see FIG. 9). The resultant laser light therefore is highly incoherent, so that interference noise, speckle noise, and other types of noise of the light having a converted wavelength can be reduced.

Figure 11:
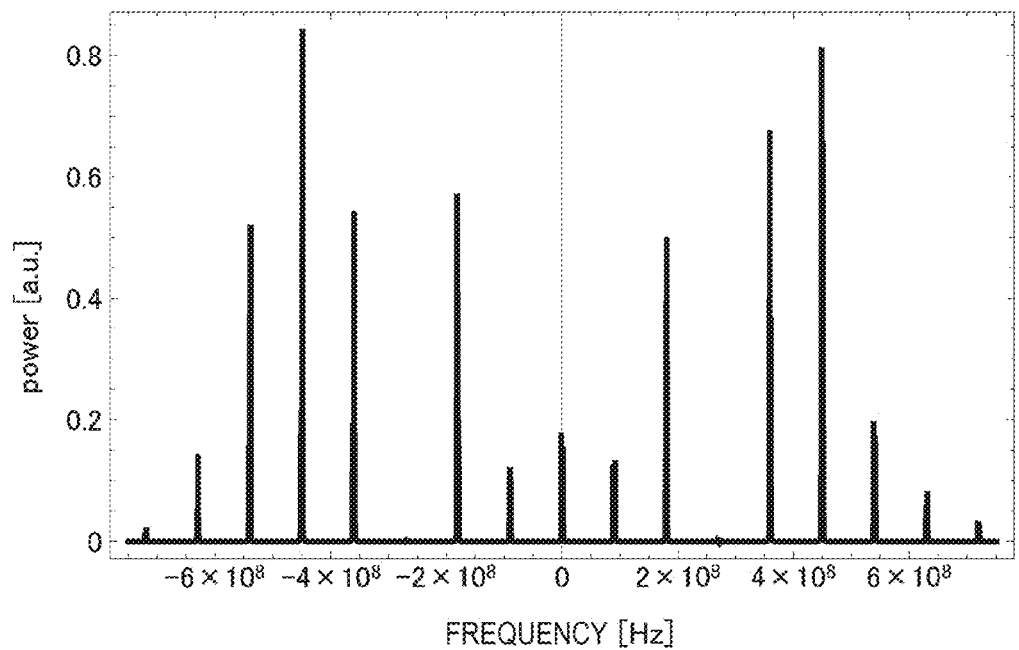
FIG. 11 is a graph showing an example of the spectrum of laser light output from an optical frequency modulator in the first embodiment.

In the frequency modulation using a single frequency shown in the first embodiment, the optical frequency modulator 114 widens the spectrum of continuous-wave laser light into a comb-shaped spectrum including the fundamental frequency and the harmonics thereof (see FIG. 11). FIG. 11 shows an example in which the frequency of the modulation signal is 90 MHz and the phase shift is $2\pi$.

4. Electronic Device Manufacturing Method

Figure 12:
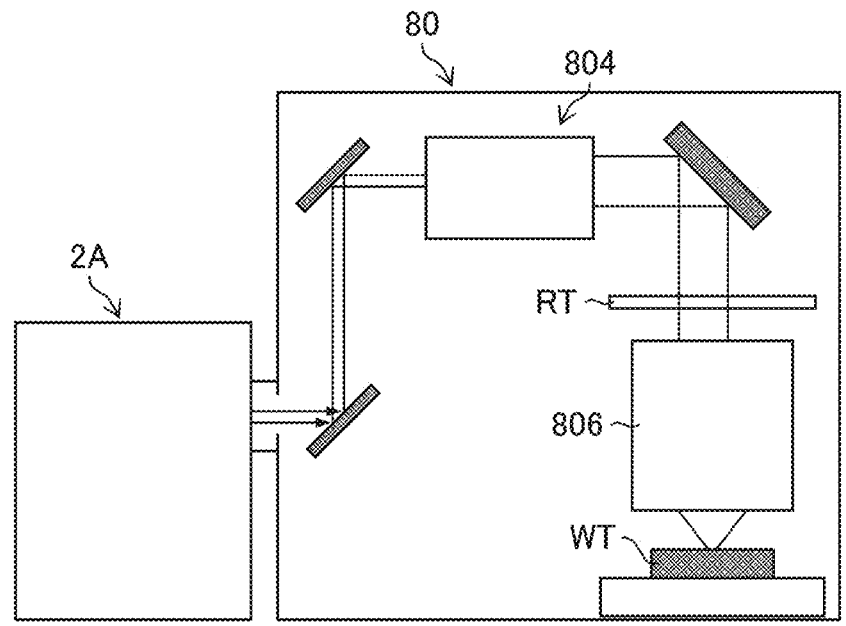
FIG. 12 schematically shows an example of the configuration of an exposure apparatus.

FIG. 12 schematically shows an example of the configuration of the exposure apparatus 80. The exposure apparatus 80 includes an illumination optical system 804 and a projection optical system 806. The laser system 2A generates the fifth pulse laser light PL5 and outputs the fifth pulse laser light PL5 to the exposure apparatus 80. The illumination optical system 804 illuminates a reticle pattern of a reticle that is not shown but is placed on a reticle stage RT with the laser light having entered the exposure apparatus 80 from the laser system 2A. The projection optical system 806 performs reduction projection on the laser light having passed through the reticle to bring the laser light into focus on a workpiece that is not shown but is placed on a workpiece table WT. The workpiece is a photosensitive substrate onto which a photoresist has been applied, such as a semiconductor wafer.

The exposure apparatus 80 translates the reticle stage RT and the workpiece table WT in synchronization with each other to expose the workpiece to the laser light having reflected the reticle pattern. Semiconductor devices can be manufactured by transferring the reticle pattern onto the semiconductor wafer in the exposure step described above and then carrying out plural other steps. The semiconductor devices are an example of the "electronic devices" in the present disclosure. The laser system 2A is not necessarily used, and any of the laser systems 2B, 2C, and other laser systems may be used.

5. Others

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more". Further, the term "at least one of A, B, and C" should be interpreted to mean any of A, B, C, A+B, A+C, B+C, and A+B+C. Moreover, the term described above should be interpreted to include combinations of any thereof and any other than A, B, and C.

What is claimed is:

1. A laser system comprising:
a first laser configured to output first continuous-wave laser light;
an optical intensity changer configured to pulse the first laser light and output first pulse laser light;
a modulator configured to widen a spectral linewidth of the first laser light or the first pulse laser light in accordance with a modulation signal;
an optical fiber amplifier configured to amplify the first pulse laser light and output second pulse laser light;
a center-wavelength-variable second laser configured to output second continuous-wave laser light;
an optical parametric amplifier configured to pulse and amplify the second laser light and output third pulse laser light;
a wavelength converter configured to output fourth pulse laser light by using the second pulse laser light and the third pulse laser light, the wavelength converter including a first nonlinear crystal, a second nonlinear crystal, a third nonlinear crystal, and a fourth nonlinear crystal,
in response to receiving the second pulse laser light, the first nonlinear crystal outputting first harmonic light,
in response to receiving the first harmonic light, the second nonlinear crystal outputting second harmonic light,
in response to receiving the second harmonic light and the third pulse laser light, the third nonlinear crystal outputting first sum-frequency light and the third pulse laser light,
in response to receiving the first sum-frequency light and the third pulse laser light, the fourth nonlinear crystal outputting fourth pulse laser light that is second sum-frequency light;
an amplification section configured to amplify the fourth pulse laser light and output fifth pulse laser light; and
a processor configured to accept instructions of a target spectral linewidth and a target center wavelength, control the modulation signal in such a way that the fifth pulse laser light having the instructed target spectral linewidth is generated, and control a center wavelength of the second laser light in such a way that the fifth pulse laser light having the instructed target center wavelength is generated.

2. The laser system according to claim 1, wherein the modulator is an optical frequency modulator using an acousto-optic device.

3. The laser system according to claim 1, wherein the modulator is an optical phase modulator using an electro-optic effect.

4. The laser system according to claim 3, further comprising:
a modulation signal generator configured to output the modulation signal to the optical phase modulator;
wherein the modulation signal generator includes
a white noise generator configured to generate a white noise signal,
a variable lowpass filter configured to restrict high-frequency components of the white noise signal; and
a power adjuster configured to control an attenuation rate or an amplification rate at which the white noise signal is attenuated or amplified, and
the processor outputs a band control signal that restricts the high-frequency components to the variable lowpass filter and outputs an attenuation rate control signal or an amplification rate control signal to the power adjuster.

5. The laser system according to claim 1, further comprising:
a wavelength monitor configured to measure a center wavelength of the fifth pulse laser light,
wherein the processor is configured to control the center wavelength of the second laser light based on a result of the measurement performed by the wavelength monitor.

6. The laser system according to claim 1, further comprising:
a linewidth monitor configured to measure a spectral linewidth of the fifth pulse laser light,
wherein the processor is configured to control the modulation signal based on a result of the measurement performed by the linewidth monitor.

7. The laser system according to claim 1,
wherein the processor is configured to store relationship data on a relationship between a spectral linewidth of the fifth pulse laser light and the modulation signal and control the modulation signal based on the relationship data.

8. The laser system according to claim 1,
wherein the first nonlinear crystal is an LBO crystal.

9. The laser system according to claim 1,
wherein the second, third, and fourth nonlinear crystals are each a CLBO crystal.

10. The laser system according to claim 1, further comprising:
a dichroic mirror configured to combine the second pulse laser light and the second laser light with each other,
wherein the second pulse laser light and the second laser light combined with each other by the dichroic mirror enter the optical parametric amplifier.

11. The laser system according to claim 1,
wherein the optical intensity changer is a semiconductor optical amplifier.

12. The laser system according to claim 1,
wherein the optical intensity changer is an optical intensity modulator using an electro-optic effect.

13. The laser system according to claim 1,
wherein the first and second lasers are each a semiconductor laser configured to oscillate in a single longitudinal mode.

14. The laser system according to claim 1,
wherein the first laser light and the second laser light each have a near-infrared wavelength.

15. The laser system according to claim 1,
wherein the fourth pulse laser light has an ultraviolet wavelength.

16. A pulse laser light generating method comprising:
causing a first laser to output first continuous-wave laser light;
causing an optical intensity changer to pulse the first laser light and output first pulse laser light;
causing a modulator to widen a spectral linewidth of the first laser light or the first pulse laser light in accordance with a modulation signal;

causing an optical fiber amplifier to amplify the first pulse laser light and output second pulse laser light;
causing a center-wavelength-variable second laser to output second continuous-wave laser light;
causing an optical parametric amplifier to pulse and amplify the second laser light and output third pulse laser light;
inputting the second pulse laser light to a first nonlinear crystal provided in a wavelength converter further including, a second nonlinear crystal, a third nonlinear crystal, and a fourth nonlinear crystal to cause the first nonlinear crystal to output first harmonic light;
inputting the first harmonic light to the second nonlinear crystal to cause the second nonlinear crystal to output second harmonic light;
inputting the second harmonic light and the third pulse laser light to the third nonlinear crystal to cause the third nonlinear crystal to output first sum-frequency light and the third pulse laser light;
inputting the first sum-frequency light and the third pulse laser light to the fourth nonlinear crystal to cause the fourth nonlinear crystal to output fourth pulse laser light that is second sum-frequency light;
causing an amplification section to amplify the fourth pulse laser light and output fifth pulse laser light;
causing a processor to control the modulation signal in such a way that the fifth pulse laser light having a target spectral linewidth instructed from an external apparatus is generated; and
causing the processor to control a center wavelength of the second laser light in such a way that the fifth pulse laser light having a target center wavelength instructed from the external apparatus is generated.

17. An electronic device manufacturing method comprising:
generating fifth pulse laser light by a laser system;
outputting the fifth pulse laser light to an exposure apparatus; and
exposing a photosensitive substrate to the fifth pulse laser light in the exposure apparatus to manufacture electronic devices,
the laser system including
a first laser configured to output first continuous-wave laser light,
an optical intensity changer configured to pulse the first laser light and output first pulse laser light,
a modulator configured to widen a spectral linewidth of the first laser light or the first pulse laser light in accordance with a modulation signal,
an optical fiber amplifier configured to amplify the first pulse laser light and output second pulse laser light,
a center-wavelength-variable second laser configured to output second continuous-wave laser light,
an optical parametric amplifier configured to pulse and amplify the second laser light and output third pulse laser light,
a wavelength converter configured to output fourth pulse laser light by using the second pulse laser light and the third pulse laser light, the wavelength converter including a first nonlinear crystal, a second nonlinear crystal, a third nonlinear crystal, and a fourth nonlinear crystal,
in response to receiving the second pulse laser light, the first nonlinear crystal outputting first harmonic light,
in response to receiving the first harmonic light, the second nonlinear crystal outputting second harmonic light,
in response to receiving the second harmonic light and the third pulse laser light, the third nonlinear crystal outputting first sum-frequency light and the third pulse laser light,
in response to receiving the first sum-frequency light and the third pulse laser light, the fourth nonlinear crystal outputting fourth pulse laser light that is second sum-frequency light,
an amplification section configured to amplify the fourth pulse laser light and output the fifth pulse laser light, and
a processor configured to accept instructions of a target spectral linewidth and a target center wavelength, control the modulation signal in such a way that the fifth pulse laser light having the instructed target spectral linewidth is generated, and control a center wavelength of the second laser light in such a way that the fifth pulse laser light having the instructed target center wavelength is generated.

* * * * *